United States Patent
Gillooly et al.

(10) Patent No.: US 12,523,685 B2
(45) Date of Patent: Jan. 13, 2026

(54) MEDIUM VOLTAGE COORDINATED WAVEFORM RECORDING

(71) Applicant: Aclara Technologies LLC, St. Louis, MO (US)

(72) Inventors: Gregory Bruce Gillooly, Cleveland Heights, OH (US); John Burch, St. Louis, MO (US)

(73) Assignee: Aclara Technologies LLC, St. Louis, MO (US)

( * ) Notice: Subject to any disclaimer, the term of this patent is extended or adjusted under 35 U.S.C. 154(b) by 694 days.

(21) Appl. No.: 17/902,596

(22) Filed: Sep. 2, 2022

(65) Prior Publication Data
US 2023/0079522 A1 Mar. 16, 2023

Related U.S. Application Data

(60) Provisional application No. 63/240,610, filed on Sep. 3, 2021.

(51) Int. Cl.
*G01R 19/25* (2006.01)
*H02J 13/00* (2006.01)

(52) U.S. Cl.
CPC .... *G01R 19/2513* (2013.01); *H02J 13/00002* (2020.01)

(58) Field of Classification Search
CPC .... G01R 19/2513; G01R 19/25; G01R 19/00; H02J 13/00002; H02J 13/00
See application file for complete search history.

(56) References Cited

U.S. PATENT DOCUMENTS

2006/0187074 A1   8/2006   O'Sullivan et al.
2007/0005193 A1*  1/2007   Nelson ............... H02H 3/063
                                                      700/286
(Continued)

FOREIGN PATENT DOCUMENTS

CN            103376387 A      10/2013

OTHER PUBLICATIONS

PCT/US2022/042524 International Search Report and Written Opinion dated Jan. 4, 2023.
(Continued)

*Primary Examiner* — Mohamed Charioui
(74) *Attorney, Agent, or Firm* — Michael Best & Friedrich LLP

(57) ABSTRACT

Systems and methods for coordinating monitoring devices associated with a medium voltage distribution system. The systems include a data aggregation device, a first monitoring device associated with a first phase of the medium voltage distribution system, and a second monitoring device associated with a second phase of the medium voltage distribution system. The first monitoring device is configured to sense one or more parameters of the first phase, store the one or more stored parameters, and determine whether an event has occurred based on the sensed parameters. The first monitoring device is further configured to transmit a coordination signal to a second monitoring device in response to determining the event has occurred and a first event message to a data aggregator device in response to determining the event has occurred, wherein the event message includes one or more sensed parameters associated with the determined event.

20 Claims, 18 Drawing Sheets

(56) References Cited

U.S. PATENT DOCUMENTS

| | | |
|---|---|---|
| 2010/0179779 A1 | 7/2010 | Taft |
| 2010/0201514 A1 | 8/2010 | Barna et al. |
| 2010/0201515 A1 | 8/2010 | Barna et al. |
| 2012/0077527 A1* | 3/2012 | Santiago ............ H02J 13/00034 |
| | | 702/58 |
| 2012/0146623 A1* | 6/2012 | Roscoe ................ H02H 1/0015 |
| | | 702/117 |
| 2015/0233994 A1 | 8/2015 | Verneau et al. |
| 2016/0041216 A1 | 2/2016 | Tang et al. |
| 2016/0072270 A1* | 3/2016 | Rostron ................. H02H 3/081 |
| | | 700/294 |
| 2017/0328937 A1 | 11/2017 | Schuetz et al. |

OTHER PUBLICATIONS

European Search Report dated Jun. 17, 2025 for corresponding European Application No. 22865631.0.

* cited by examiner

MEDIUM VOLTAGE COORDINATED WAVEFORM RECORDING

CROSS-REFERENCE TO RELATED APPLICATIONS

This application claims priority to, and the benefit of, provisional U.S. Patent Publication No. 63/240,610, filed Sep. 3, 2021, the contents of which are incorporated herein in its entirety.

FIELD

The embodiments disclosed herein relate to coordinating line monitor recording within a medium voltage power distribution network.

BACKGROUND

In medium voltage distribution networks, an event (e.g., overcurrent fault) may occur on a single phase, which may not be severe enough to trigger any monitoring devices on other phases in the same distribution network. This can result in only limited data being provided to a utility or distribution network operation. Data from other phases during the time of the detected event can be beneficial in fully understanding the event, as well as for developing possible mitigation or repair operations related to the detected event.

SUMMARY

According to one aspect, a first monitoring device is associated with a first phase of medium voltage power distribution system. The first monitoring device includes one or more sensors configured to sense one or more parameters of the first phase of the medium voltage power distribution system, a communication module, and a controller. The controller is configured to store the one or more sensed parameters in a memory of the first monitoring device, determine whether an event has occurred based on the sensed parameters, determine a duration of the event, and transmit a first coordination signal to at least a second monitoring device associated with a second phase of the medium voltage power distribution system via the communication module in response to determining the event has occurred. The duration of the event is one of a permanent event and a momentary event. The controller is also configured to transmit a first event message to a data aggregator device in response to determining the event has occurred, wherein the event message includes one or more sensed parameters associated with the determined event and the duration of the event.

In another aspect, a method for coordinating one or more monitoring devices associated with a voltage distribution system is described, according to some embodiments. The method includes sensing one or more parameters of a first phase of the medium voltage power distribution system, storing the one or more sensed parameters in a memory of a first monitoring device, determining whether an event associated with the first phase has occurred based on the sensed one or more parameters, and determining a duration of the event. The duration of the event is one of a permanent event and a momentary event. The method also includes transmitting a first coordination signal to a second monitoring device associated with a second phase of the medium voltage power distribution system via the communication module in response to determining the event has occurred, and transmitting a first message to a data aggregator device in response to determining the event has occurred, wherein the event message includes one or more sensed parameters associated with the determined event and the determined duration of the event.

In another aspect, a system for coordinating one or more monitoring devices associated with a medium voltage distribution system is described, according to some embodiments. The system includes a data aggregation device, a first monitoring device associated with a first phase of the medium voltage distribution system, and a second monitoring device associated with a second phase of the medium voltage distribution system. The first monitoring device is configured to sense one or more parameters of the first phase, store the one or more stored parameters in a memory of the first monitoring device, determine whether an event has occurred based on the sensed parameters, and determine a duration of the event. The determined duration is one of a permanent event and a momentary event. The first monitoring device is further configured to transmit a coordination signal to at least a second monitoring device associated with a second phase of the medium voltage power distribution system via the communication module in response to determining the event has occurred. The first monitoring device is also configured to transmit a first event message to the data aggregator device in response to determining the event has occurred, wherein the event message includes one or more sensed parameters associated with the determined event and the duration of the event.

Other aspects of the technology will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

Figure 1:
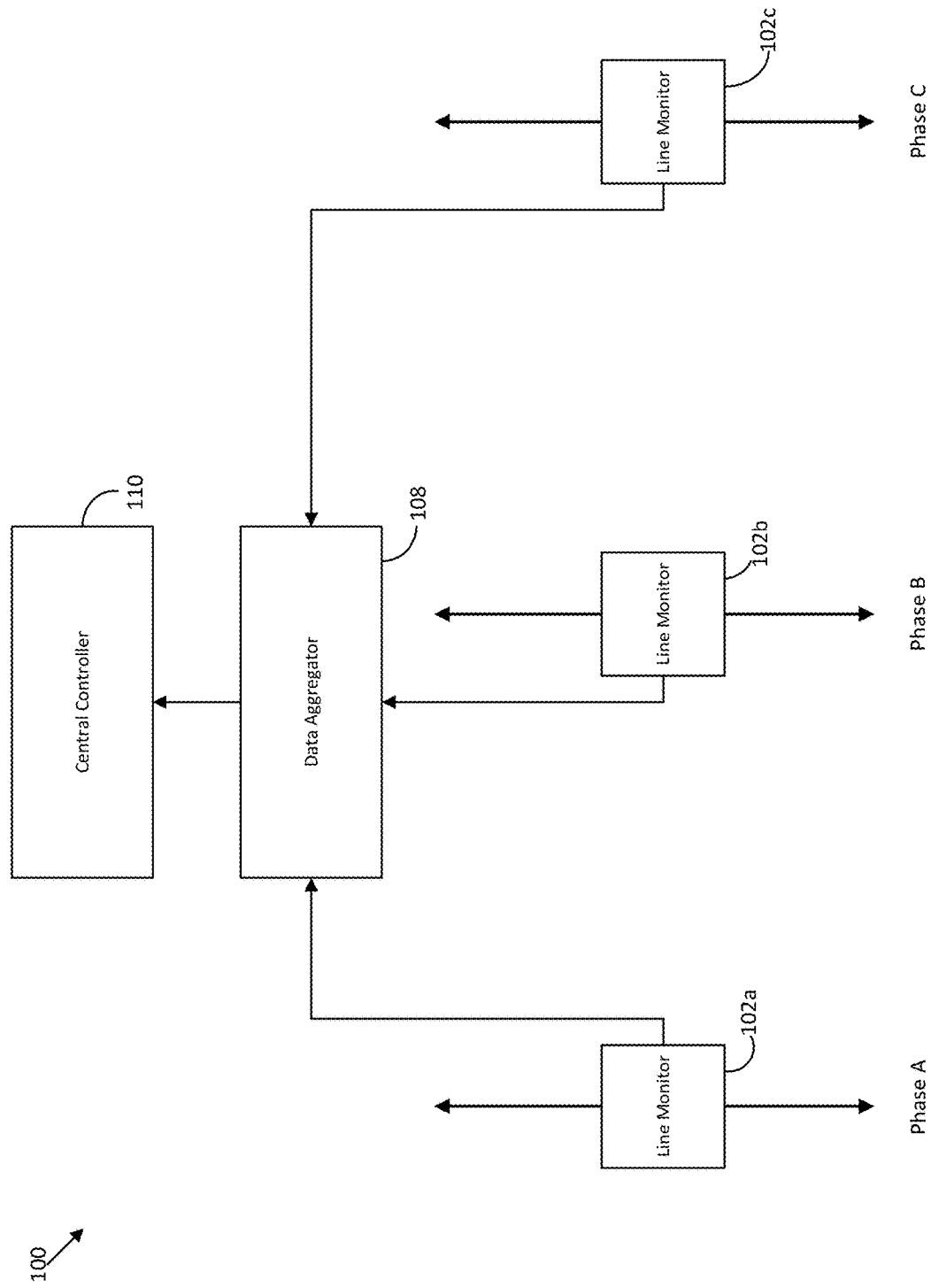
FIG. 1 is a block diagram illustrating one exemplary embodiment of a medium voltage distribution system.

FIG. 1 illustrates an example medium voltage distribution system 100, in accordance with an embodiment of the disclosure. A medium voltage distribution system generally provides voltage in a range from 4 kV to about 69 kV AC. Furthermore, medium voltage distribution systems are generally three-phase AC systems, including phases A, B, and C. The medium voltage distribution system 100 includes one or more line monitors 102a-c, which interface with individual phases of the medium voltage distribution system 100. For example, as shown in FIG. 1, line monitor 102a is in communication with Phase A, line monitor 102b is in communication with Phase B, and line monitor 102c is in communication with Phase C. However, other arrangements of the line monitors 102a-c are also contemplated. In some examples, line monitors 102a-c may monitor one or more aspects or parameters for an associated phase of the medium voltage distribution system 100. For example, the line monitors 102a-c may monitor current, voltage, motion, or other parameter of the associated phase of the medium voltage distribution system using one or more sensors, as will be described in more detail below. In one embodiment, the line monitors 102a-c may be electrically coupled to a medium voltage power line of the phase associated with the given line monitor 102a-c. In other examples, the line monitors 102a-c may be physically coupled to a support structure such as a power pole or other structure and may include one or more electrical connections to a medium voltage power line.

The medium voltage distribution system 100 further includes a data aggregator 108. The data aggregator 108 is configured to be in electronic communication with the one or more line monitors 102a-c, and to process data received from the line monitors 102a-c. As will be described in more detail below, the data aggregator 108 may be configured to process the individual data from each line monitor 102a-c to generate system data of the medium voltage distribution system 100. The data aggregator 108 is further configured to transmit data to a central controller 110. The central controller 110 may be configured to process both the individual and system data provided by the data aggregator 108. In some instances, the central controller 110 may be configured to determine various conditions of the medium voltage distribution system 100. In some examples, the conditions may include phase balance, zero-sequence, average current/power/voltage, and the like.

Figure 2:
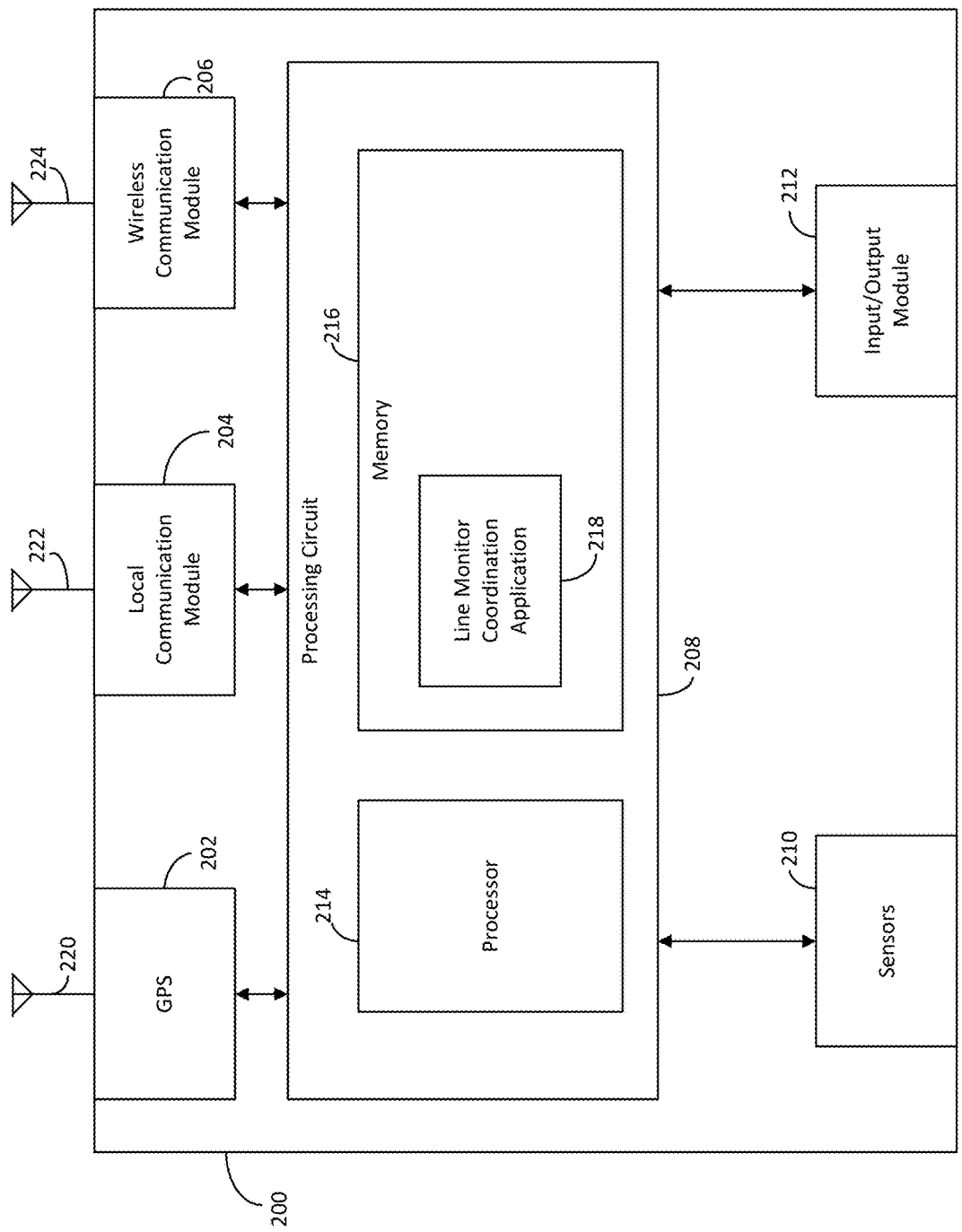
FIG. 2 is a block diagram illustrating one exemplary embodiment of a line monitor of FIG. 1.

Turning now to FIG. 2, a block diagram of a line monitor 200 is shown, according to some embodiments. The line monitor 200 may be similar or the same as the line monitors 102a-c described above. As noted above, the line monitor 200 may be configured to monitor one or more parameters associated with a medium voltage distribution system, such as medium voltage distribution system 100, described above. The line monitor 200 is further configured to communicate with one or more other devices, such as an aggregate controller and other line monitors. In some embodiments, the line monitor 200 includes a GPS module 202, a local communication module 204, a wireless communication module 206, a processing circuit 208, one or more sensors 210, and an input/output module 212.

The processing circuit 208 may include a processor 214 and a memory 216. The processing circuit 208 may be communicably connected to one or more of the GPS module 202, the local communication module 204, the wireless communication module 206, the sensors 210 and/or the I/O module 212. The electronic processor 214 may be implemented as a programmable microprocessor, an application specific integrated circuit (ASIC), one or more field programmable gate arrays (FPGA), a group of processing components, or with other suitable electronic processing components.

The memory 216 (for example, a non-transitory, computer-readable medium) includes one or more devices (for example, RAM, ROM, flash memory, hard disk storage, etc.) for storing data and/or computer code for completing or facilitating the various processes, layers, and modules described herein. The memory 216 may include database components, object code components, script components, or other types of code and information for supporting the various activities and information structure described in the present application. According to one example, the memory 216 is communicably connected to the electronic processor 214 via the processing circuit 208 and may include computer code for executing (for example, by the processing circuit 208 and/or the electronic processor 214) one or more processes described herein.

In one embodiment, the memory 216 may include one or more applications, programs, etc., such as a line monitor coordination application 218. The line monitor coordination application 218 may be configured to perform one or more data collection and synchronization actions which will be described in more detail below.

The GPS module 202 is configured to receive positional information from a number of global positioning satellites. The positional information may be provided to the processing circuit 208, which may in turn be communicated to a data aggregator and/or central controller, such as those described above, via the wireless communication module 206. The GPS module 202 may be coupled to an antenna 220 for receiving positioning information from the one or more global positioning satellites. While the GPS module 202 is described as using global positioning satellites, in some embodiments other positioning satellites, such as GLONASS satellites, may also be used as appropriate for a given application. The GPS module 202 is further configured to provide a time signal to the line monitor 200. By using time signals across multiple line monitors 200, time-based coordination between the line monitors 200 is possible due to the high accuracy of GPS based time signals.

The local communication module 204 may be configured to provide communications between line monitors 200. For example, as shown in FIG. 1, line monitors 102a-c may be configured to communicate with each other via individual local communication modules 204. The local communication module 204 may use one or more wireless communication protocols to provide communication to/from the line monitor 200. In one embodiment, the local communication module uses Bluetooth Low Energy ("BLE") to communication to/from the line monitor 200. However, other wireless communication protocols, such as Bluetooth, Cellular (e.g., 3G, 4G, 5G, LTE, CDMA, TDMA, etc.), RF, Wi-Fi, LoRa, LoRa, WAN, Z-wave, Thread, and/or any other applicable wireless communication protocol. In one embodiment, the local communication module 204 is coupled to an antenna 222 for communicating to/from the line monitor 200. In other examples, the local communication module 204 uses one or more wired communication protocols to provide communication between line monitors 200. For example, wired communications such as RS-232, Ethernet, fiber optic, Firewire, USB, USB-C, and the like may be used by the local communication module 204 to provide communications to/from the line monitor 200.

The wireless communication module 206 is configured to provide communication between the line monitor 200 and one or more other devices, such as a data aggregator 108 and/or a central controller 110. In one embodiment, the wireless communication module 206 is configured to use one or more wireless communication protocols to provide communication to/from the line monitor 200. In one embodiment, the wireless communication module 206 used a cellular wireless communication protocol, such as 3G, 4G, 5G, LTE, CDMA, TDMA, or other cellular communication protocol as required for a given application. However, other wireless communication protocols, such as Bluetooth, RF, Wi-Fi, Wi-MAX, LoRa, LoRa, WAN, Z-wave, Thread, and/or any other applicable wireless communication protocol. In one embodiment, the wireless communication module 206 is coupled to an antenna 224 for communicating to/from the line monitor 200. In other examples, the wireless communication module 206 may also be configured to use one or more wired communication protocols to provide communication between line monitors 200. For example, wired communications such as Power Line Communication ("PLC"), RS-232, Ethernet, fiber optic, Firewire, USB, USB-C, and the like may be used by the wireless communication module 206 to provide communications to/from the line monitor 200. In some examples, the wireless communication module 206 and the local communication module 204 may be combined in a single communication module.

The sensors 210 may include one or more sensors configured to monitor one or more aspects of an associated medium voltage power line. In one embodiment, the sensors 210 includes a current sensor for determining a current flowing through a phase coupled to the line monitor 200. The current sensor may be a current transformer ("CT") type current sensor in one embodiment. In other embodiments, the current sensor may be a Rogowski coil. The sensors 210 may further include voltage sensors for detecting a voltage on the phase coupled to the line monitor 200. Other sensors may include inclinometers, accelerometers, temperature sensors, electronic field (E-Field) sensors, radio frequency/partial discharge ("RF/PD") sensors, or other sensors as required for a given application. Inclinometers and/or accelerometers may be used to detect a movement or position of the power line coupled to the line monitor 200. RF/PD sensors may be configured to detect RF signals generated by faulty connections or failing switches associated with a medium voltage power line and/or system.

The I/O module 212 may be configured to interface directly with one or more devices, such as a power supply, a power monitor, etc. In one embodiment, the I/O module 212 may utilize general purpose I/O (GPIO) ports, analog inputs, digital inputs, etc.

Figure 3:
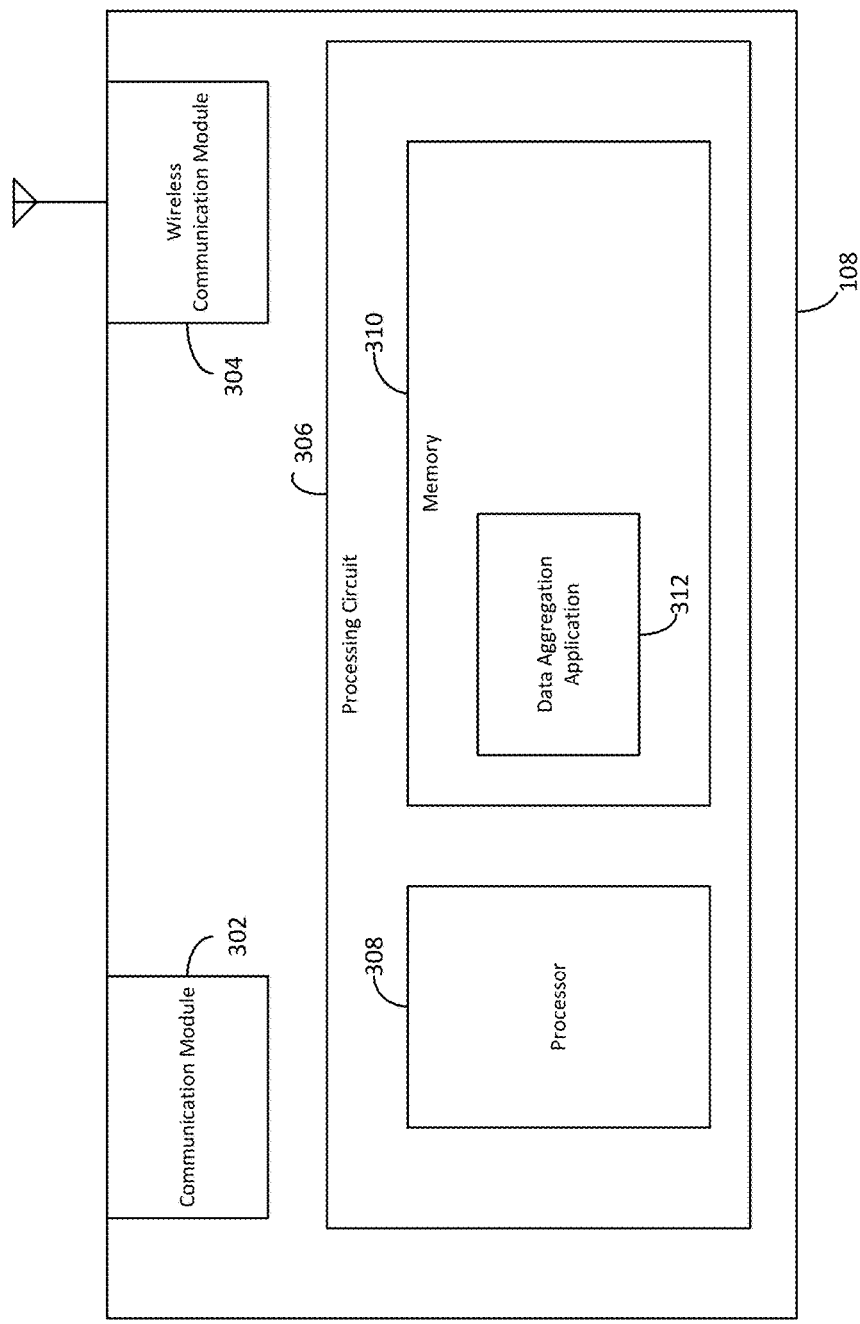
FIG. 3 is a block diagram illustrating one exemplary embodiment of a data aggregator of FIG. 1.

Turning now to FIG. 3, a block diagram of a data aggregator 108 is shown, according to some embodiments. The data aggregator 108 may be similar to the data aggregator 108 described above. The data aggregator 108 may be a standalone device, or may be a part of one or more devices, such as a central controller 110. As shown in FIG. 3, the data aggregator 108 includes a communication module 302, a wireless communication module 304, and a processing circuit 306. The processing circuit 306 includes an electronic processor 308 and a memory 310. The processing circuit 306 may be communicably connected to one or more of the communication module 302 and the wireless communication module 304. The electronic processor 308 may be implemented as a programmable microprocessor, an application specific integrated circuit (ASIC), one or more field programmable gate arrays (FPGA), a group of processing components, or with other suitable electronic processing components.

The memory 310 (for example, a non-transitory, computer-readable medium) includes one or more devices (for example, RAM, ROM, flash memory, hard disk storage, etc.) for storing data and/or computer code for completing or facilitating the various processes, layers, and modules described herein. The memory 310 may include database components, object code components, script components, or other types of code and information for supporting the various activities and information structure described in the present application. According to one example, the memory 310 is communicably connected to the electronic processor 308 via the processing circuit 306 and may include computer code for executing (for example, by the processing circuit 306 and/or the electronic processor 308) one or more processes described herein. For example, the memory 310 may include a data aggregation application 312. The data aggregation application 312 is configured to perform one or more data aggregation operations based on data from one or more line monitors 200 as described in more detail below.

The communication module 302 may be configured to facilitate communication between the data aggregator 108 and one or more external devices or systems, such as central controller 110. The communication module 302 may be or include wireless communication interfaces (for example, antennas, transmitters, receivers, transceivers, etc.) for conducting data communications between the data aggregator 108 and one or more external devices, such as the central controller 110. In some embodiments, the communication module 302 utilizes a proprietary protocol for communicating with the central controller 110. For example, the proprietary protocol may be an RF-based protocol configured to provide efficient and effective communication between the data aggregator 108 and the central controller 110 and/or other devices. In other embodiments, other wireless communication protocols may also be used, such as cellular (3G, 4G, 5G, LTE, CDMA, etc.), Wi-Fi, LoRa, LoRa, WAN, Z-wave, Thread, and/or any other applicable wireless communication protocol. The communication module may further utilize one or more wired communication protocols, such as Ethernet, Fiber, RS-485, Power Line Communication, etc.

The wireless communication module 304 may be configured to facilitate communication between the data aggregator 108 and one or more line monitors 200. The wireless communication module 304 may be or include wireless communication interfaces (for example, antennas, transmitters, receivers, transceivers, etc.) for conducting data communications between the data aggregator 108 and one or more line monitors 200. In some embodiments, the wireless communication module 304 utilizes a proprietary protocol for communicating with the one or more line monitors 200. For example, the proprietary protocol may be an RF-based protocol configured to provide efficient and effective communication between the data aggregator 108 and the line monitors 200 and/or other devices. In other embodiments, other wireless communication protocols may also be used, such as cellular (3G, 4G, 5G, LTE, CDMA, etc.), Wi-Fi, LoRa, LoRa, WAN, Z-wave, Thread, and/or any other applicable wireless communication protocol. In some examples, the wireless communication module 304 and the communication module 302 may be combined in a single communication module.

Figure 4:
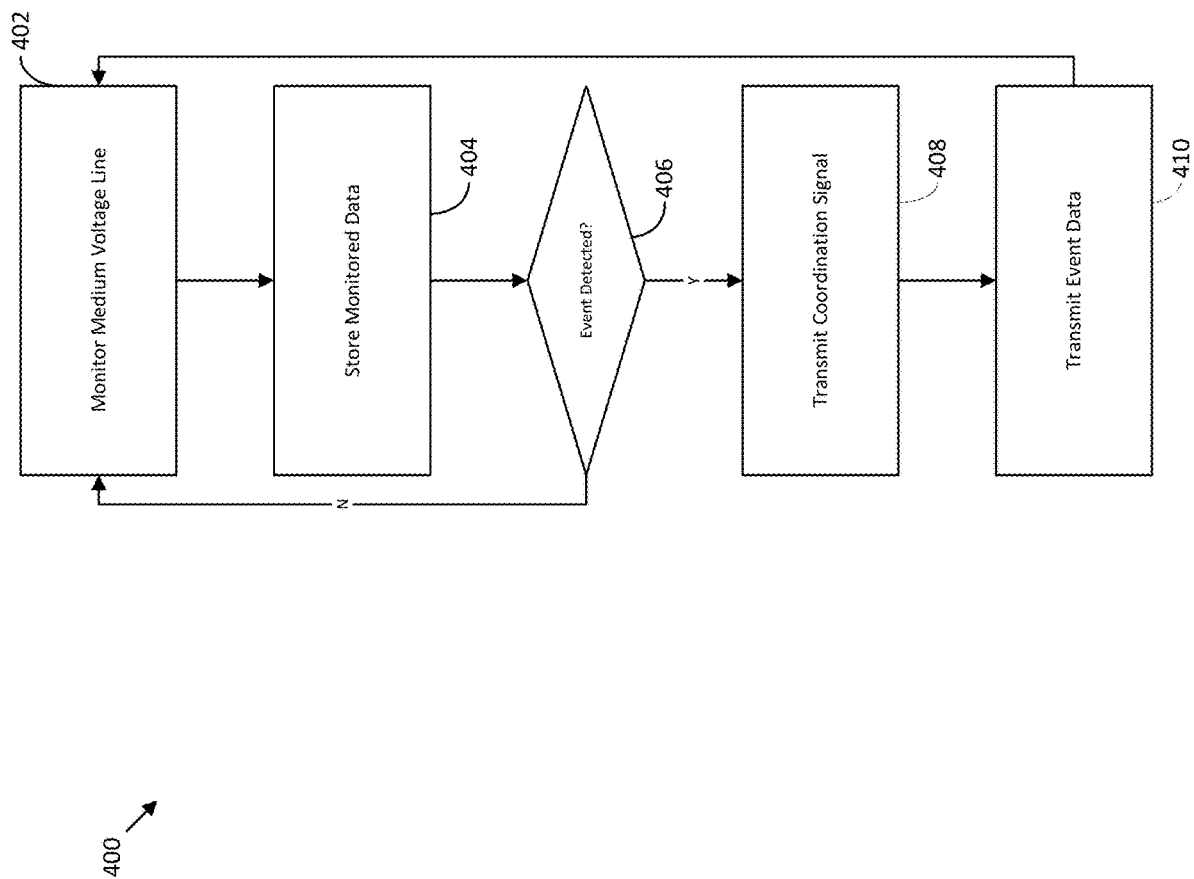
FIG. 4 is a flowchart illustrating one exemplary embodiment of a line monitor coordination process, according to some embodiments.

Turning now to FIG. 4, a flow chart illustrating a process 400 for coordinating multiple line monitors during an event is shown, according to some embodiments. At process block 402, a phase of a medium voltage power distribution system is monitored. In one embodiment, a line monitor, such as line monitor 200 described above, may monitor the phase. Monitoring the phase may include monitoring one or more electrical or mechanical parameters of the phase. For example, a current of the phase may be monitored. In other examples, voltage, temperature, acceleration, angle, and/or other parameters as appropriate for a given application are monitored via the line monitor 200. As described above, one or more sensors, such as sensors 210, may be used to monitor the phase.

At process block 404, the monitored data is stored. In one embodiment, the monitored data is stored in a memory of the line monitor 200, such as memory 216. At process block 406, the line monitor 200 determines whether an event has occurred. The processing circuit 208 of the line monitor 200 may analyzing data from the one or more sensors to determine whether an event has occurred. An event may be determined to have occurred where one or more of the parameters exceeds a predetermined threshold. In one embodiment, an event is determined to have occurred when a monitored current exceeds the predetermined threshold. In some examples, an increase in current over time exceeding the predetermined threshold may indicate an event has occurred. For example, an event may be determined to occur when the current has increased by more than 10% above a normal operating value over a predetermined period of time. However, values of more than 10% or less than 10% are also contemplated. The predetermined time may be 1 second. However, values of more than 1 second or less than 1 second are also contemplated. In one example, the predetermined time is a number of cycles, such as 5. However, values of more than 5 cycles or less than 5 cycles are also contemplated. In some examples, the normal operating value is an average operating value determined over time. However, in other examples, the normal operating value may be a maximum current rating. In some examples, an event is determined to occur when the current increase exceeds a predetermined amount in less than a predetermined time. For example, where the current increases by more than 10% in less than 1 second, an event may be determined to have occurred. In further embodiments, various other sensor data may be evaluated to determine whether an event has occurred.

In some embodiments, an event may be determined to occur when the rise in current (or other monitored parameter) exceeds a predetermined sufficient amount over a period of time. Additionally, other parameters may be factored into determining whether an event has occurred, such as a root-mean-squared ("RMS") value of the current (or other monitored parameter). For example, where a rate of increase in current exceeds a threshold rate over a threshold period of time, the processing circuit 208 may also determine whether a determined RMS value of the monitored current exceeds a predetermined value when determining whether an event has occurred. Other values, such as outage thresholds may also be evaluated against the monitored current when determining whether an event has occurred. Further, additional characteristics associated with the event may be determined by the processing circuit using the additional parameters, such as whether the event is a line disturbance, a permanent fault, or a momentary fault. For example, where the monitored current value rises more than a predetermined amount in less than a predetermined time and exceeds a predetermined RMS value and an outage threshold, the event may be determined to be a line disturbance. Alternatively, where the monitored current value rises more than a predetermined amount in less than a predetermined time, and exceeds a predetermined RMS value, but is less than an outage threshold, and continues to be less than the outage threshold after a predetermined fault wait time (e.g., 1 second), the event may be determined to be a permanent fault. In contrast, where the monitored current then exceeds the outage threshold after the predetermined fault wait time, the event may be determined to be a momentary fault.

While the above determinations of an event are described as being based on monitored current values, it is understood that other parameters, such as voltage, may also be used in determining whether an event has occurred. Additionally, events may be various event types, such as loss of current, current on, momentary, line disturbances, permanent faults, power disturbances, harmonic, high current, high current clear, sag, swell, out-of-phase, out-of-phase clear, no fault peak, etc. may be determined by the processing circuit 208. A partial listing of potential events is shown below in Table 1:

TABLE 1

| Name | Description |
| --- | --- |
| Loss of Current | Permanent loss of current |
| Current On | Restoration of current after an outage |
| Momentary | Surge followed by a temporary loss of current |
| Line Disturbance | Surge with no loss of current |
| Permanent Fault | Surge followed by a permanent loss of current |
| Power Disturbance | Temporary loss of current not preceded by a surge |
| Harmonic | Voltage harmonic content tripped threshold settings |
| High Current | Current exceeded high threshold settings |
| High Current Clear | Current returned to normal after tripping high current threshold |
| Sag | Voltage drop event tripped threshold settings |
| Swell | Voltage rise event tripped threshold settings |
| Out of Phase | Phase label does not match customer-entered parameter |
| Out of Phase Clear | Phase returned to normal after Out of Phase declared |

Additionally, the determination the above events are described in more detail below.

In response to determining that no event has occurred, the line monitor 200 continues to monitor the phase at process block 402. In response to determining that an event has been detected, the line monitor 200 transmits a coordination signal 408 to other line monitors 200. In one embodiment, the coordination signal may be transmitted via the local communication module 204. The line monitor 200 may be configured to transmit the coordination to a preselected number of additional line monitors. For example, at a given location, the line monitor 200 detecting the event is coupled to phase A, and may be configured to transmit the coordination signal to line monitors in the general geographic location that are coupled to phases B and C. In one embodiment, the line monitor coordination application 218 may be configured to select which other line monitors that the coordination signal is transmitted to by the line monitor 200. For example, where the line monitor 200 is configured to communicate with other line monitors via BLE, the BLE addresses for the additional line monitors may be stored in the line monitor coordination application 218. The line monitor coordination application 218 may interface with the local communication module 204 to transmit the data to the required additional line monitors.

The coordination signal may include instructions for the additional line monitors, as well as other data, such as a time of the detected event. At process block 410 the event data is transmitted to a data aggregator, such as data aggregator 108. The event data may include one or more measured parameters associated with the event, such as current, voltage, incline, temperature, etc. In one embodiment, the event data may include such as one or more waveforms over a period of time before, during, and after the event. For example, the event data may include parameters and/or waveforms prior to the event for a pre-event time period, such as 10 second. However, pre-event time periods of more than 10 seconds or less than 10 seconds are contemplated. In some examples, the pre-event time period may be dynamically determined based on the duration of the event. However, in other examples the pre-event time period may be pre-set by a user or system. In some examples, the event may have a duration that exceeds a pre-set event duration, and therefore the event data may be continuously transmitted to the data aggregator 108. In further examples, parameters and/or waveforms monitored after the event has ceased may also be transmitted. Similar to above, the data occurring after the event may be provided for a post-event time period, such as 10 seconds. However, values of more than 10 seconds or less than 10 seconds are also contemplated. Upon transmitting the event data, the phase continues to be monitored at process block 402.

Figure 5:
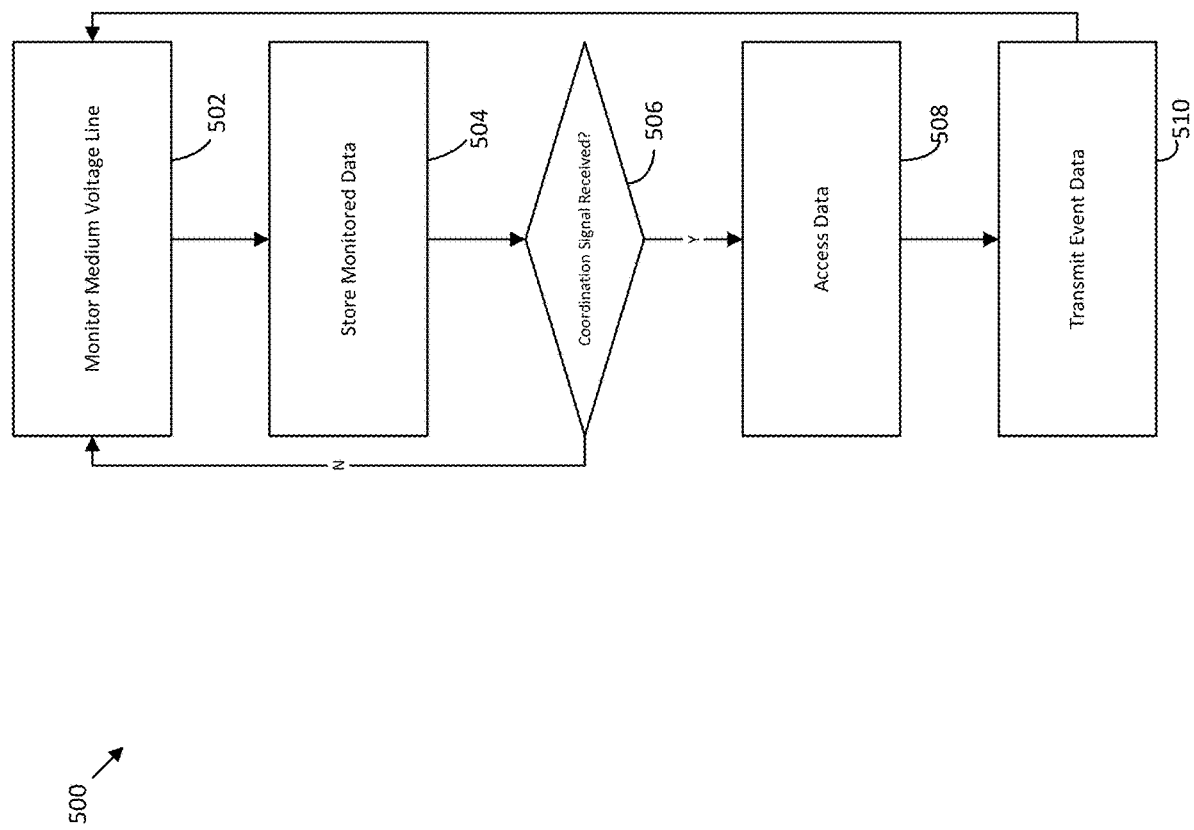
FIG. 5 is a flow chart illustrating one exemplary embodiment of a method for responding to a received coordination signal by a line monitor device of FIG. 4.

Turning now to FIG. 5, a process 500 for responding to a received coordination signal by a line monitor 200 is shown, according to some embodiments. At process block 502, a phase of a medium voltage power distribution system is monitored. In one embodiment, a line monitor, such as line monitor 200 described above, may monitor the phase. Monitoring the phase may include monitoring one or more electrical or mechanical parameters of the phase. For example, a current of the phase may be monitored. In other examples, voltage, temperature, acceleration, angle, and/or other parameters as appropriate for a given application are monitored via the line monitor 200. As described above, one or more sensors, such as sensors 210, may be used to monitor the phase.

At process block 504, the monitored data is stored. In one embodiment, the monitored data is stored in a memory of the line monitor 200, such as memory 216. At process block 506, the processing circuit 208 determines whether a coordination signal has been received. In some examples, the line monitor coordination application 218 determines if the coordination signal has been received. The coordination signal may be received via the local communication module 204. In response to determining that the coordination signal was not received, the line monitor 200 continues to monitor the phase of the medium voltage power distribution system at process block 502.

In response to determining that the coordination signal was received, the line monitor 200 accesses stored data based on the received coordination signal at process block 508. As described above, the coordination signal may include information such as a time frame from which an event occurred. Thus, the line monitor 200 may access data stored in the memory 216 based on a time frame contained in the coordination signal. In some instances, only certain data may be requested by the coordination signal, such as current. In other examples, all data monitored by the line monitor 200 during the requested time frame may be accessed. Upon accessing the requested data, the event data is transmitted to a data aggregator, such as data aggregator 108, at process block 510. The event data may include one or more measured parameters associated with the event, such as current, voltage, incline, temperature, etc. In one embodiment, the event data may include such as one or more waveforms over a period of time before, during, and after the event. For example, the event data may include parameters and/or waveforms prior to the event for a pre-event time period, such as 10 second. However, pre-event time periods of more than 10 seconds or less than 10 seconds are contemplated. In some examples, the pre-event time period may be dynamically determined based on the duration of the event. However, in other examples the pre-event time period may be pre-set by a user or system. In some examples, the event may have a duration that exceeds a pre-set event duration, and therefore the event data may be continuously transmitted to the data aggregator 108. In further examples, parameters and/or waveforms monitored after the event has ceased may also be transmitted. Similar to above, the data occurring after the event may be provided for a post-event time period, such as 10 seconds. However, values of more than 10 seconds or less than 10 seconds are also contemplated. Upon transmitting the event data, the phase continues to be monitored at process block 502.

Processes 400 and 500, described above, may both be performed in parallel on one or more line monitors 200.

Figure 6:
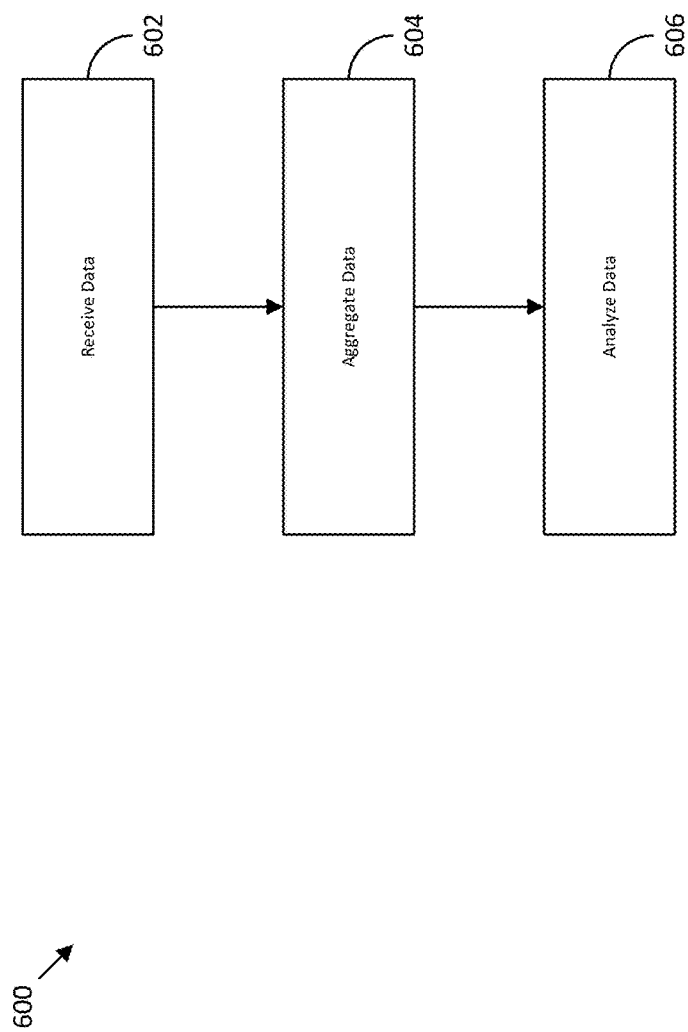
FIG. 6 is a flow chart illustrating one exemplary embodiment of a method for analyzing coordinated line monitor data.

Turning now to FIG. 6, a flowchart illustrating a process 600 for analyzing coordinated line monitor data is shown, according to some embodiments. At process block 602, data from one or more data monitors, such as line monitor 200, is received. In one embodiment, a data aggregator, such as data aggregator 108 described above, receives the data from the line monitors 200. At process block 604, data from each of the line monitors 200 is aggregated. As described above, the data aggregator 108 may aggregate the data. In one example, the data is aggregated using a coordinated time value for all of the received data. As noted above, the GPS module 202 of the line monitors 200 may provide accurate time values for all line monitors 200 within a given system.

At process block 606, the aggregated data is analyzed. In one embodiment, the data aggregator 108 may analyze the aggregated data. In other embodiments, the data aggregator 108 may transmit or otherwise provide the aggregated data to the central controller 110 for analysis. The central controller 110 may analyze the aggregated data to determine various electrical faults, parameters, etc. For example, the aggregated data may be analyzed to determine phase imbalances using synchronized current and phase angle values within the aggregated data. In another example, line to line voltage of a medium voltage system may be determined using the aggregated data based on synchronized voltage magnitude and phase angle values between phases.

In still further examples, real-time line impedance may be determined using synchronized voltage and current magnitudes and phase angles within the aggregated data. Additionally, fault types, such as line-to-ground, line-to-line, and/or line-to-line-to-ground may be determined using the aggregated data. Fault impedance and/or fault distances may further be determined using the aggregated data. As noted above, event messages may include line monitor identification and/or locational data which can be combined with the aggregated data to determine additional parameters such as fault impedance and/or fault distances.

Figure 7:
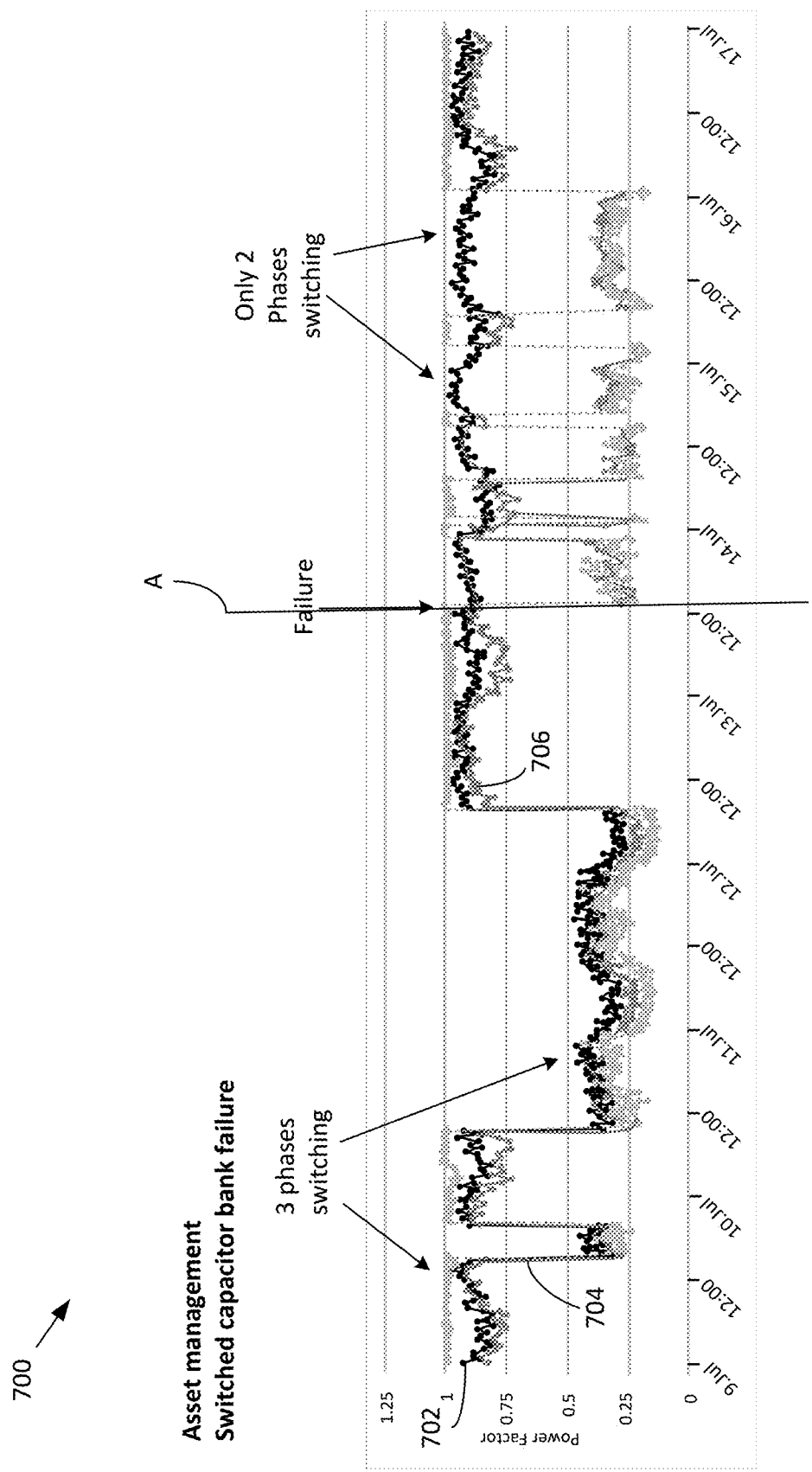
FIG. 7 is a data plot illustrating one exemplary embodiment of coordinated line monitor data during a switch capacitor bank failure event.

In one embodiment, a switched capacitor bank failure may be determined using the aggregated data. As shown in FIG. 7, phase A 702, phase B 704, and phase C 706 are shown as switching at approximately the same time. However, starting at time period A, phase A 702 fails to switch, indicating there is a switching failure. In some examples, the event data triggering the coordination signal to be generated may be a change in the power factor exceeding a predetermined threshold. For example, in one embodiment, the predetermined threshold may be 70,000 volt-amps reactive ("VAR"). However, values of more than 70,000 VARs or less than 70,000 VARs are also contemplated.

Figure 8:
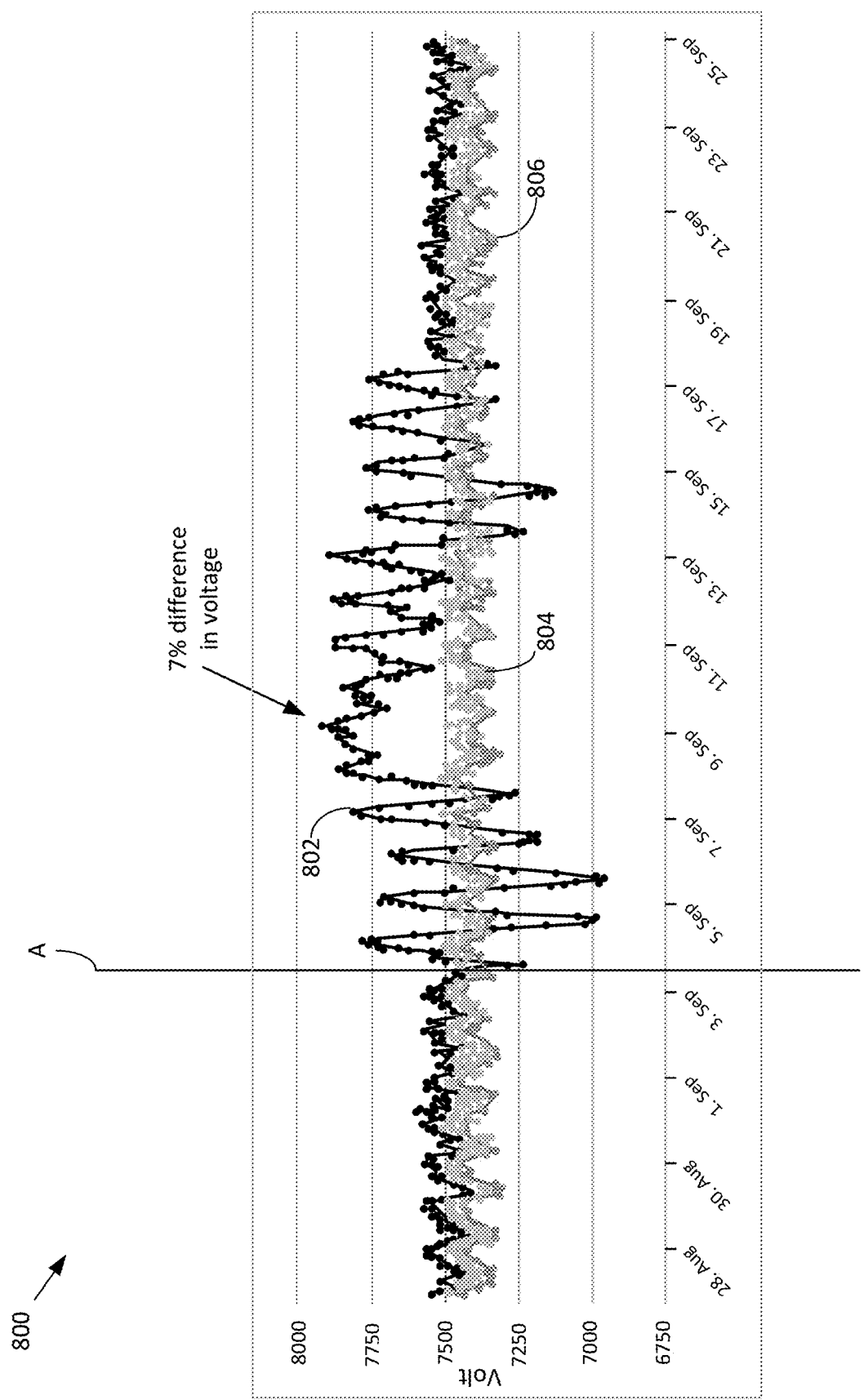
FIG. 8 is a data plot illustrating one exemplary embodiment of coordinated line monitor data during a voltage imbalance event.

In another embodiment, the aggregated data may be analyzed to determine a voltage imbalance within the medium voltage distribution system. As shown in FIG. 8, phase A voltage 802, phase B voltage 804, and phase C voltage 806 are generally in sync until time A. After time A, phase A voltage 802 increases causing a voltage imbalance. In some embodiments, the median voltage value of the three phases is used to determine the average voltage to prevent the increased phase A voltage 802 from skewing an average where the average of all three phases is used to detect a voltage imbalance. A percentage difference may be determined between the remaining two phases and the median voltage to determine whether a voltage imbalance exists.

Figure 9:
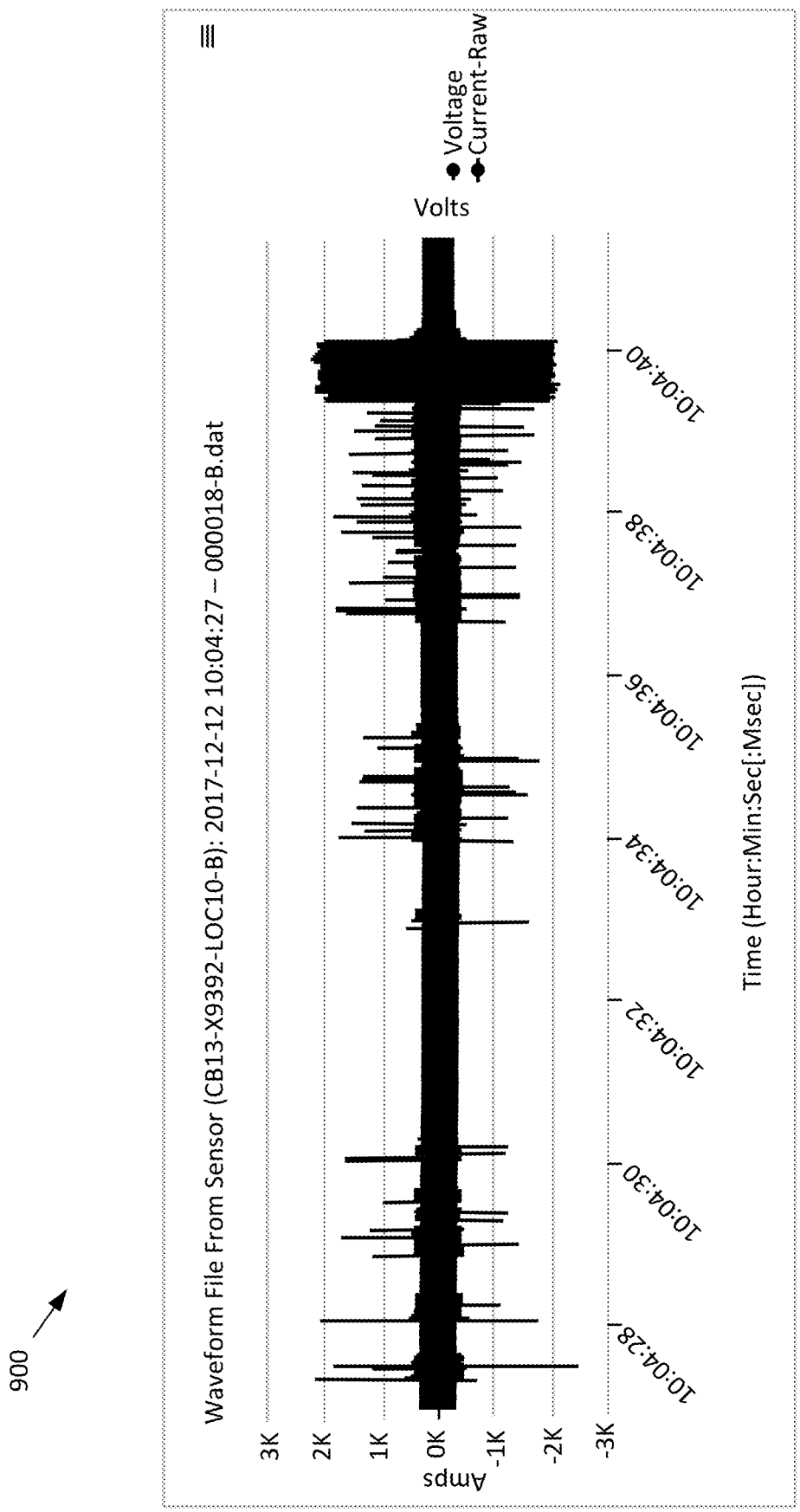
FIG. 9 is a data plot illustrating one exemplary embodiment of coordinated line monitor data during an arc fault event.

In another embodiment, the aggregated data may be analyzed to determine an arc fault condition. The phase data of each phase of the medium voltage distribution system may be analyzed to determine a number of surges (e.g., voltage and/or current values that exceed a predetermined threshold) on a given phase. As arc faults are "unstable" faults, each surge generates a number of waveform segments 900 as shown in FIG. 9. The number of waveform segments for all phases may be counted and where the number of waveform segments in a predetermined period of time exceeds a predetermined value, an arc fault condition may be determined to be occurring.

Figure 10:
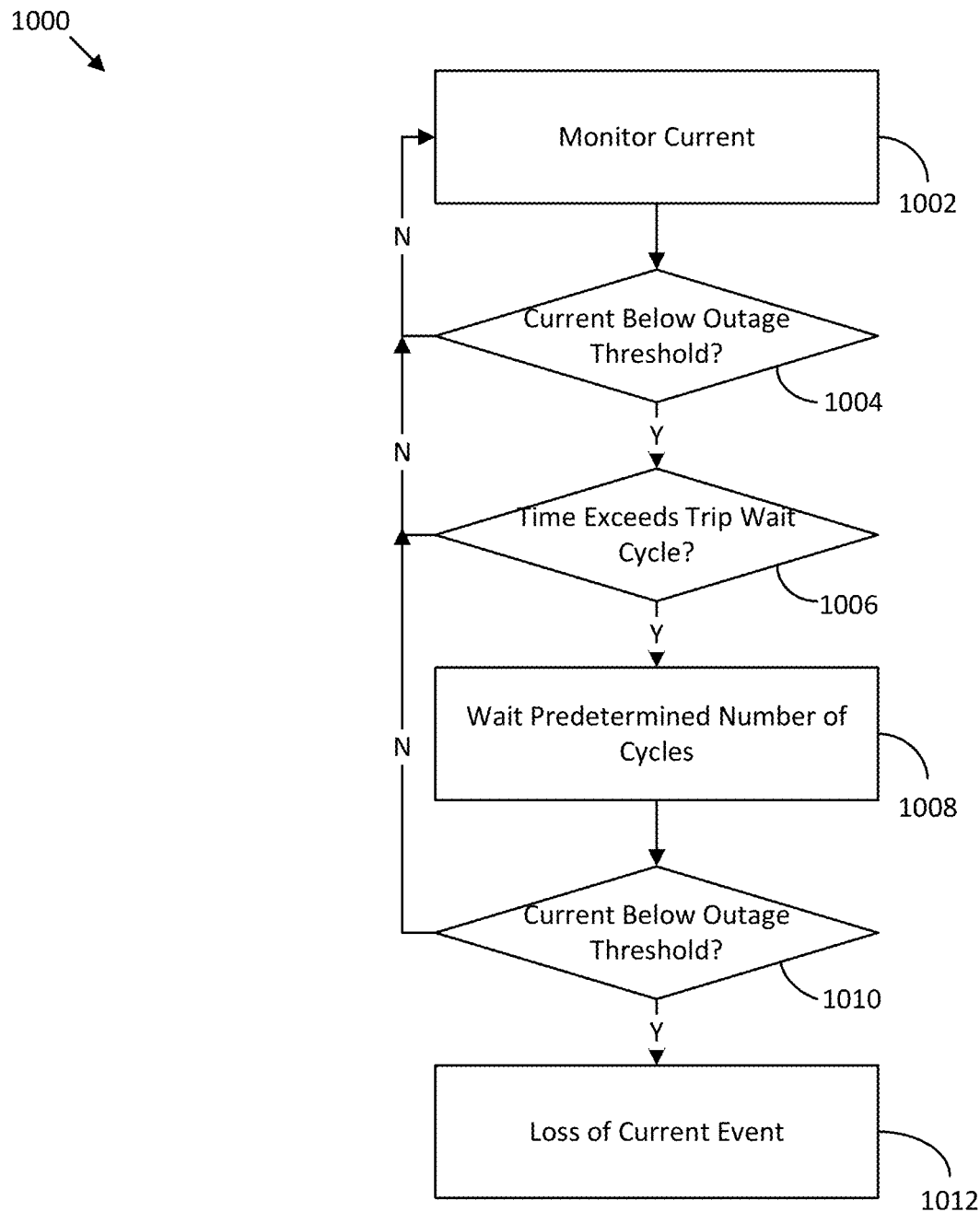
FIG. 10 is a flow chart illustrating one exemplary embodiment of a method for detecting a loss of current event.

Turning now to FIG. 10, a process 1000 for detecting a loss of current event is described, according to some embodiments. At process block 1002, a current of a medium voltage power line is monitored, such as described above. In one embodiment, the current is monitored via the sensors 210 of the line monitor 200. While the process 1000 is described with respect to line monitor 200 described above, it is understood that one or more other components, such as the data aggregator 108, the central controller 110, and/or other components may perform one or more of the operations described herein. At process block 1004, the processing circuit 208 determines whether the monitored current falls below an outage threshold value. In one embodiment, the outage threshold value may be a predetermined current value associated with an outage condition (e.g., reduced or no power provided by a power generation device). In other embodiments, the outage threshold value may be a percentage of an expected full-load current for a given distribution system.

In response to determining that the current is not below the outage threshold, the current continues to be monitored at process block 1002. In response to determining that the current is below the outage threshold, the processing circuit 208 determines whether the time the value has been below the outage threshold exceeds a trip wait cycle time. The trip wait cycle time may be a time required for a tripped device (e.g., circuit breaker, recloser, etc.) to reset. For example, the trip wait cycle time may be one second. However, trip wait cycle times of more than one second or less than one second are also contemplated. In response to determining that the time does not exceed the trip wait cycle time, the monitoring of the current is resumed at process block 1002. In response to determining that the time does exceed the trip wait cycle, the processing circuit 208 waits for a predetermined number of cycles at process block 1008. In one embodiment, the number of cycles is 30 (e.g., 0.5 seconds). However, wait times of more than 30 cycles or less than 30 cycles are also contemplated. Upon waiting the predetermined number of cycles, the processing circuit 208 determines whether the monitored current is still below the outage threshold at process block 1010. In response to determining that the current is not below the outage threshold, the monitoring of the current is resumed at process block 1002. In response to determining that the current is below the outage threshold, a loss of current event is determined to exist at process block 1012. Determination of the event may trigger one or more actions, as described in detail above.

Figure 11:
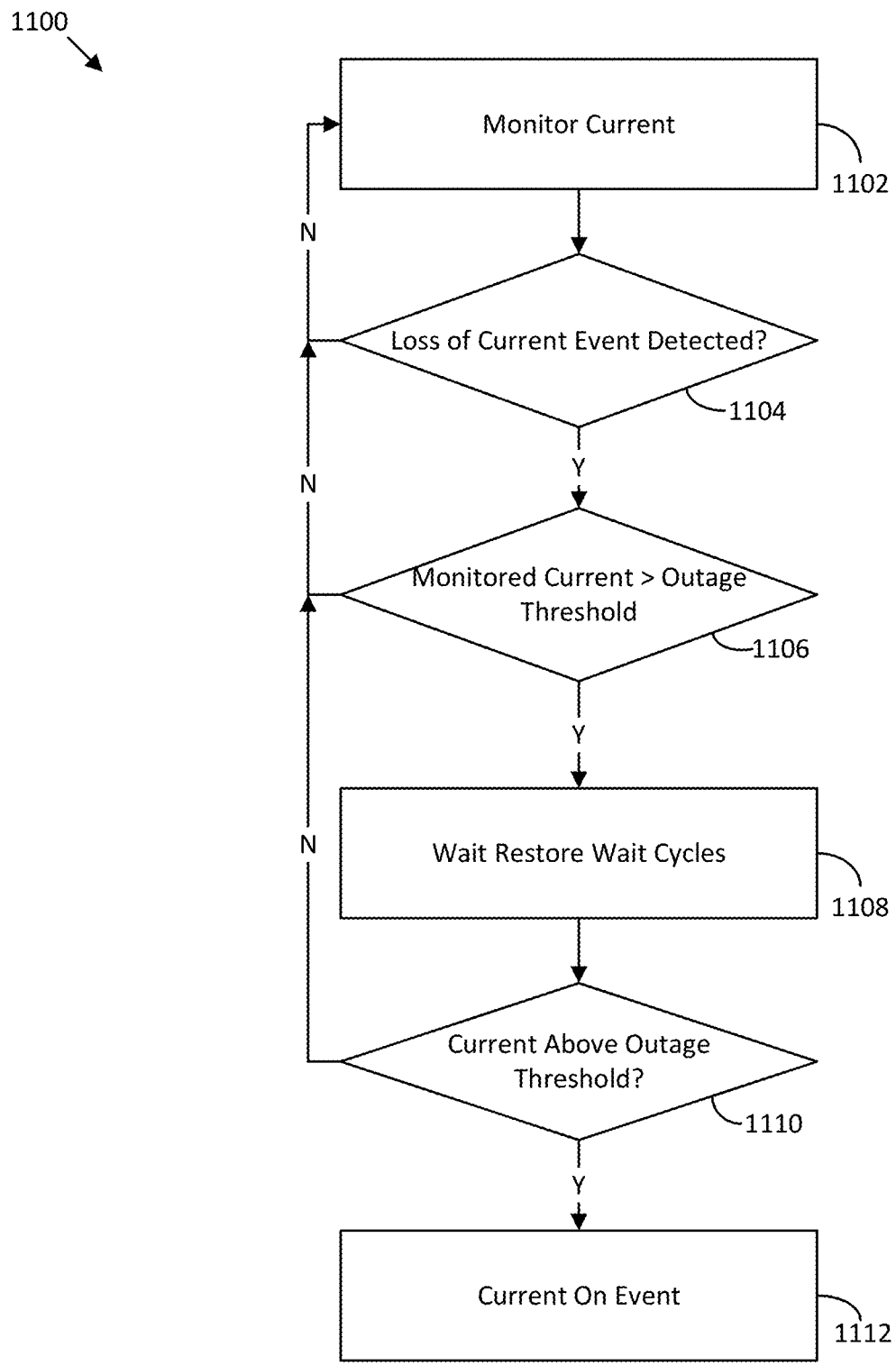
FIG. 11 is a flow chart illustrating one exemplary embodiment of a method for detecting a Current ON event.

Turning now to FIG. 11, a process 1100 for detecting a current ON event is described, according to some embodiments. At process block 1102, a current of a medium voltage power line is monitored, such as described above. In one embodiment, the current is monitored via the sensors 210 of the line monitor 200. While the process 1100 is described with respect to line monitor 200 described above, it is understood that one or more other components, such as the data aggregator 108, the central controller 110, and/or other components may perform one or more of the operations described herein. At process block 1104, the processing circuit 208 determines whether a loss of current event has been detected. In one embodiment, the loss of current event may be determined using the process 1000 described above. In response to determining that no loss of current event has been detected, the monitoring of the current continues at process block 1102. In response to determining that a loss of current event has been detected, the processing circuit 208 determines whether the monitored current is above an outage threshold value at process block 1106. The outage threshold value may be similar to the outage threshold value described above.

In response to determining that the current is not above the outage threshold, the current continues to be monitored at process block 1102. In response to determining that the current is above the outage threshold, the processing circuit 208 waits for a predetermined number of cycles at process block 1108. In one embodiment, the number of cycles is 30 (e.g., 0.5 seconds). However, wait times of more than 30 cycles or less than 30 cycles are also contemplated. Upon waiting the predetermined number of cycles, the processing circuit 208 determines whether the monitored current is still above the outage threshold at process block 1110. In response to determining that the current is not above the outage threshold, the monitoring of the current is resumed at process block 1102. In response to determining that the current is below the outage threshold, a current ON event is determined to exist at process block 1112. Determination of the event may trigger one or more actions, as described in detail above.

Figure 12:
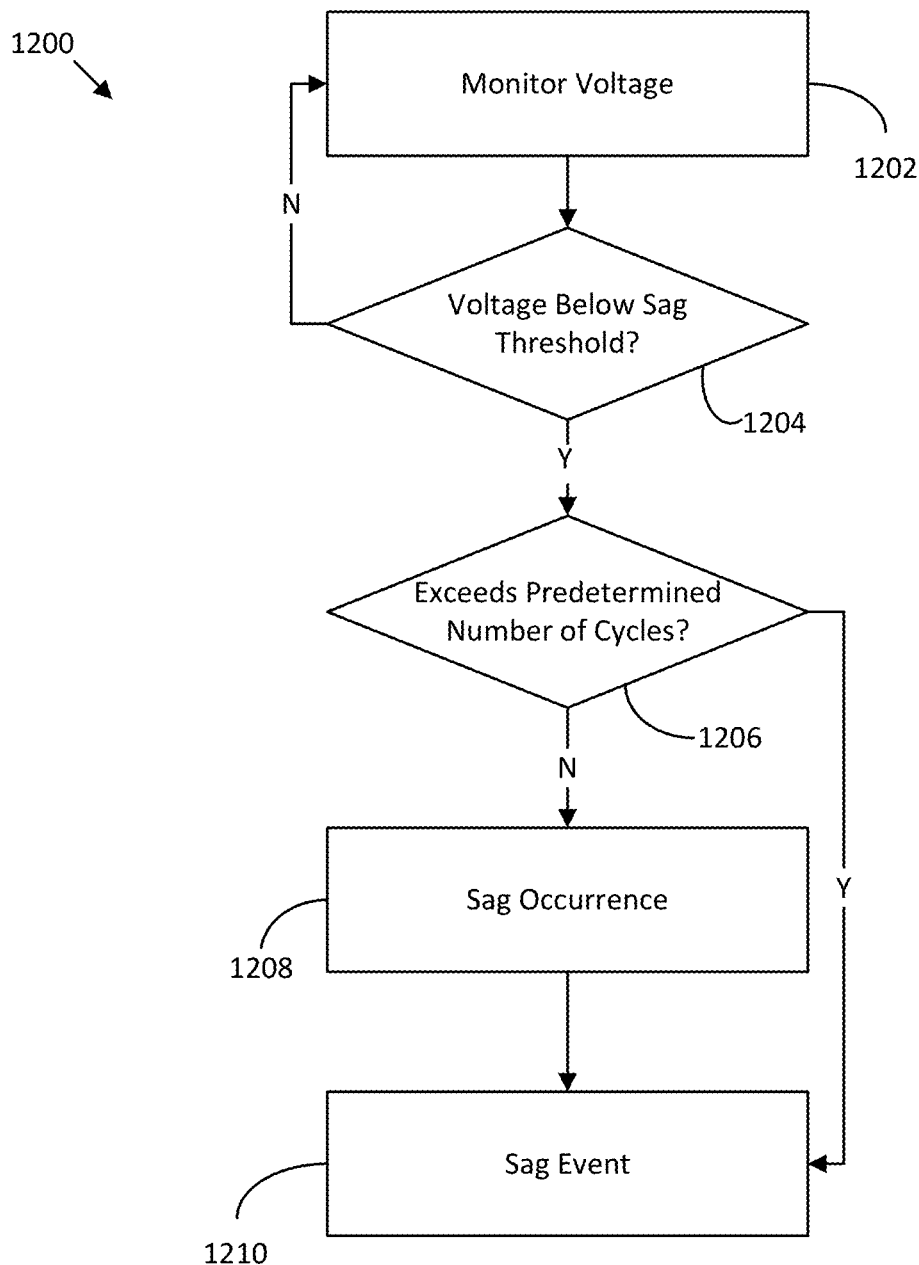
FIG. 12 is a flow chart illustrating one exemplary embodiment of a method for detecting a voltage sag event.

Turning now to FIG. 12, a process 1200 for detecting a voltage sag event is described, according to some embodiments. At process block 1202, a voltage of a medium voltage power line is monitored, such as described above. In one embodiment, the voltage is monitored via the sensors 210 of the line monitor 200. While the process 1200 is described with respect to line monitor 200 described above, it is understood that one or more other components, such as the data aggregator 108, the central controller 110, and/or other components may perform one or more of the operations described herein. At process block 1204, the processing circuit 208 determines whether the monitored voltage is below a sag threshold. In one embodiment, the sag threshold may be a predetermined voltage level. In other embodiments, the sag threshold may be a percentage of an open circuit voltage associated with the respective medium voltage power line. For example, the percentage may be 80%. However, percentage of more than 80% or less than 80% are also contemplated. In response to determining that the monitored voltage is not below the sag threshold, the monitoring of the voltage continues at process block 1202. In response to determining that the monitored voltage is below the sag threshold, the processing circuit 208 determines whether the monitored voltage remains below the sag threshold for a predetermined number of cycles at process block 1206. For example, the predetermined number of cycles may be 30. However, values of more than 30 cycles or less than 30 cycles are also contemplated. While the above determination is based on a number of cycles, other examples may determine whether the monitored voltage remains below the sag threshold for a predetermined amount of time. For example, the predetermined amount of time may be one second. However, values of more than one second or less than one second are also contemplated.

In response to determining that the voltage does not remain below the sag threshold for the predetermined number of cycles, a sag occurrence is determined at process block 1208. In response to determining that the voltage does remain below the sag threshold for the predetermined number of cycles, the processing circuit 208 determines that a sag event has occurred at process block 1210. Determination of the event may trigger one or more actions, as described in detail above.

Figure 13:
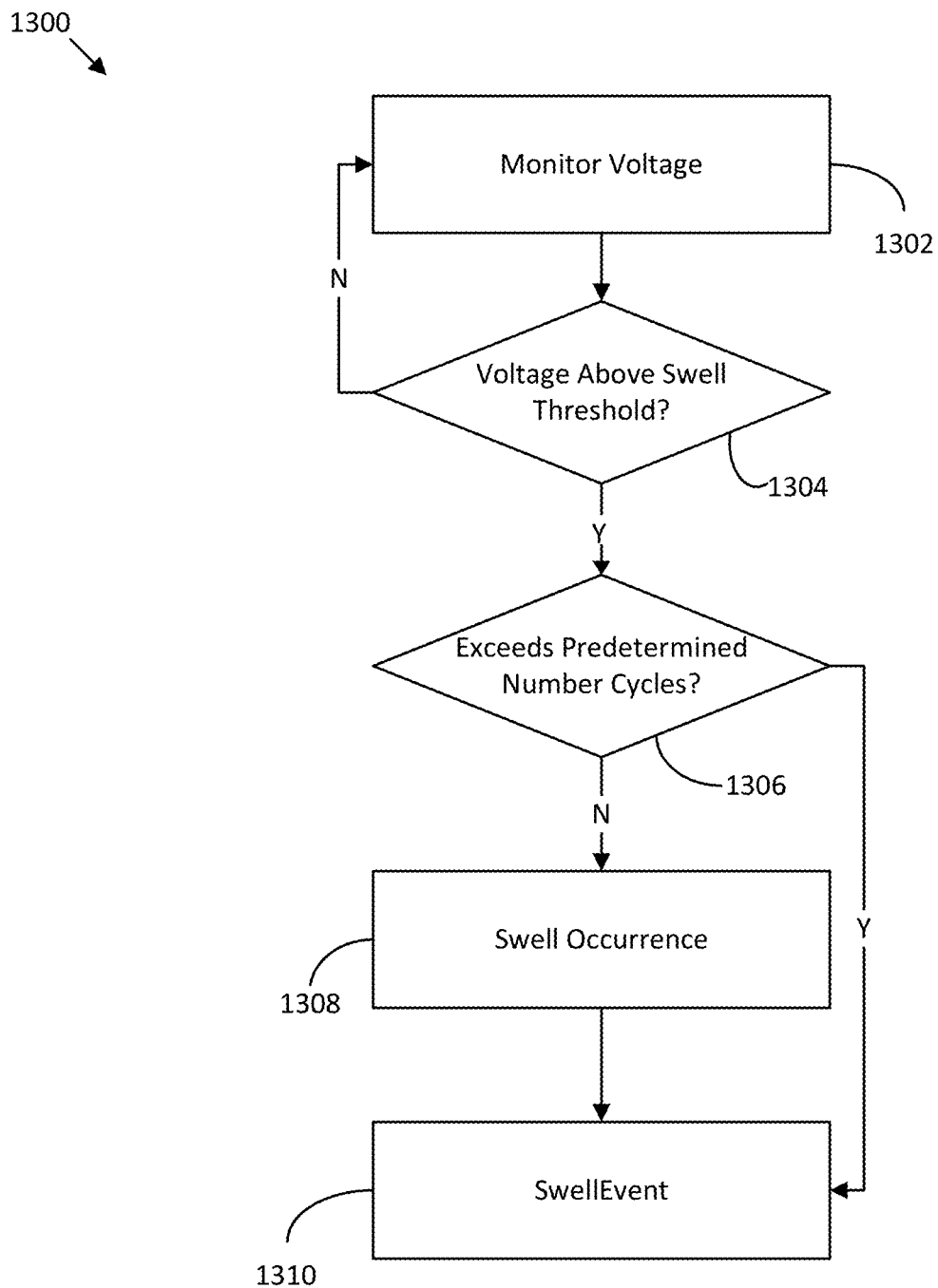
FIG. 13 is a flow chart illustrating one exemplary embodiment of a method for detecting a voltage swell event.

Turning now to FIG. 13, a process 1300 for detecting a voltage swell event is described, according to some embodiments. At process block 1302, a voltage of a medium voltage power line is monitored, such as described above. In one embodiment, the voltage is monitored via the sensors 210 of the line monitor 200. While the process 1300 is described with respect to line monitor 200 described above, it is understood that one or more other components, such as the data aggregator 108, the central controller 110, and/or other components may perform one or more of the operations described herein. At process block 1304, the processing circuit 208 determines whether the monitored voltage is above a voltage swell threshold. In one embodiment, the voltage swell threshold may be a predetermined voltage level. In other embodiments, the voltage swell threshold may be a percentage of an open circuit voltage associated with the respective medium voltage power line. For example, the percentage may be 120%. However, percentage of more than 120% or less than 120% are also contemplated. In response to determining that the monitored voltage is not above the voltage swell threshold, the monitoring of the voltage continues at process block 1302. In response to determining that the monitored voltage is above the voltage swell threshold, the processing circuit 208 determines whether the monitored voltage remains above the voltage swell threshold for a predetermined number of cycles at process block 1306. For example, the predetermined number of cycles may be 30. However, values of more than 30 cycles or less than 30 cycles are also contemplated. While the above determination is based on a number of cycles, other examples may determine whether the monitored voltage remains below the sag threshold for a predetermined amount of time. For example, the predetermined amount of time may be one second. However, values of more than one second or less than one second are also contemplated.

In response to determining that the voltage does not remain above the voltage swell threshold for the predetermined number of cycles, a voltage swell occurrence is determined at process block 1308. In response to determining that the voltage does remain above the voltage swell threshold for the predetermined number of cycles, the processing circuit 208 determines that a voltage swell event has occurred at process block 1310. Determination of the event may trigger one or more actions, as described in detail above.

Figure 14:
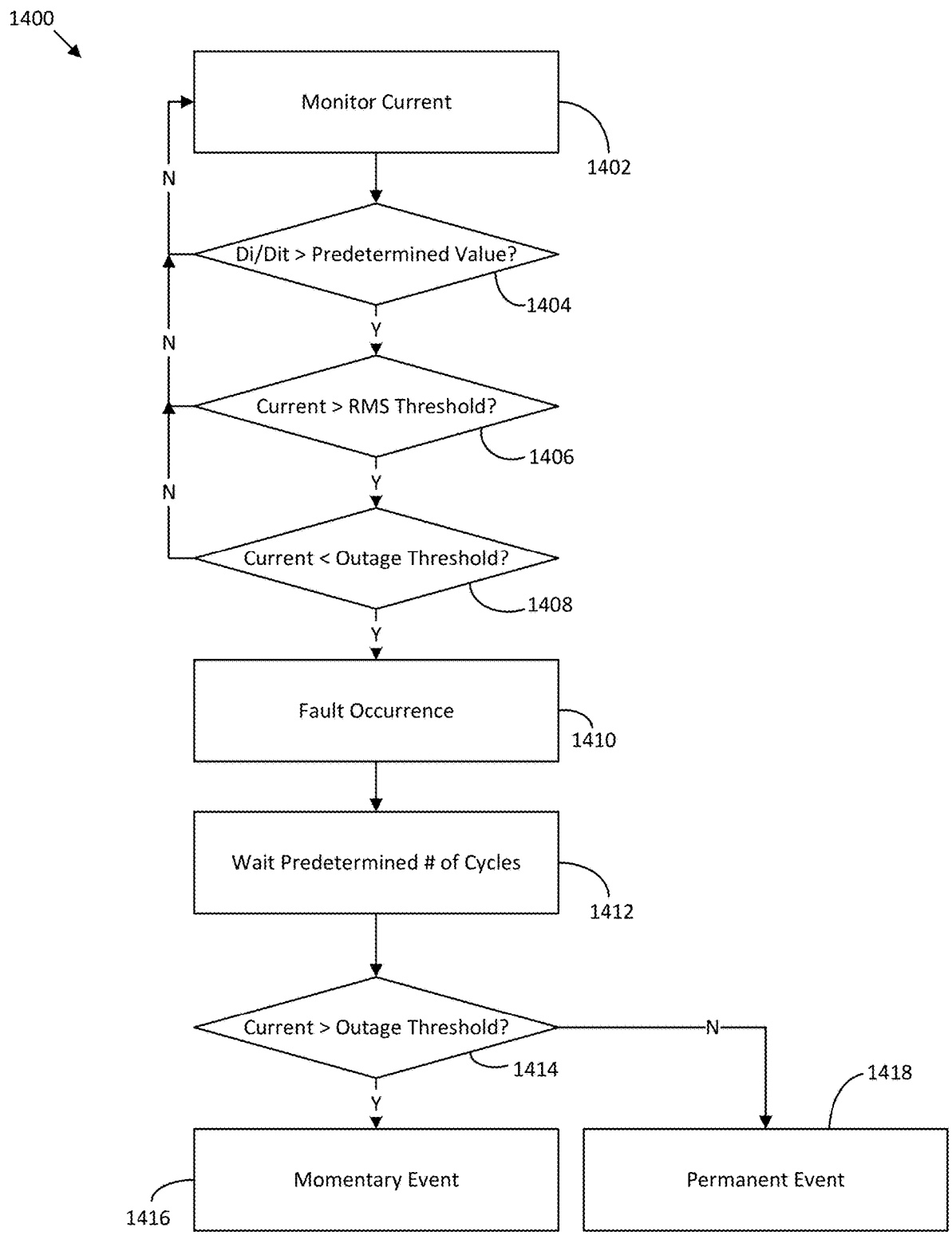
FIG. 14 is a flow chart illustrating one exemplary embodiment of a method for detecting a duration of an event.

Turning now to FIG. 14, a process 1400 for determining a duration of an event is described, according to some embodiments. At process block 1402, a current of a medium voltage power line is monitored, such as described above. In one embodiment, the current is monitored via the sensors 210 of the line monitor 200. While the process 1400 is described with respect to line monitor 200 described above, it is understood that one or more other components, such as the data aggregator 108, the central controller 110, and/or other components may perform one or more of the operations described herein. At process block 1404, the processing circuit 208 determines whether an increase in the current value over time exceeds a predetermined value. In some examples, the increase in current value over time may be expressed as $d_i/d_t$. The predetermined value may be based on one or more factors, such as line voltage, line loading, or other applicable parameters.

In response to determining that the increase in the current value over time does not exceed the predetermined value, the monitoring of the current continues at process block 1402. In response to determining that the increase in the current value over time does exceed the predetermined value, the processing circuit 208 determines whether the monitored current exceeds an expected RMS threshold value at process block 1406. In response to determining that the monitored current does not exceed the expected RMS threshold value, the monitoring of the current continues at process block 1402. In response to determining that the current does exceed the RMS threshold, the processing circuit 208 determines whether the monitored current is less than an outage threshold at process block 1408. In one embodiment, the outage threshold may be similar to that described in process 1000 above.

In response to determining that the monitored current is not below the outage threshold, monitoring of the current is continued at process block 1402. In response to determining that the monitored current is below the outage threshold, an event is determined to have occurred at process block 1410. Upon determining that a fault has occurred, the processing circuit 208 waits a predetermined number of cycles. In one embodiment, the number of cycles is 30 (e.g., 0.5 seconds).

However, wait times of more than 30 cycles or less than 30 cycles are also contemplated. Upon waiting the predetermined number of cycles, the processing circuit 208 determines whether the monitored current is above the outage threshold at process block 1414.

In response to determining that the monitored current is greater than the outage threshold, the event is determined to be a momentary event at process block 1416. In response to determining that the monitored current is not greater than the outage threshold, the event is determined to be a permanent event at process block 1418.

While the above process is described with regards to monitoring current, it is understood that one or more of the above-described process steps may be used with a monitored voltage to determine whether the voltage-based fault is momentary or permanent. Furthermore, it is contemplated that in some applications, not all of the above steps in process 1400 may be required to determine whether an event is a permanent event or a momentary event.

Figure 15:
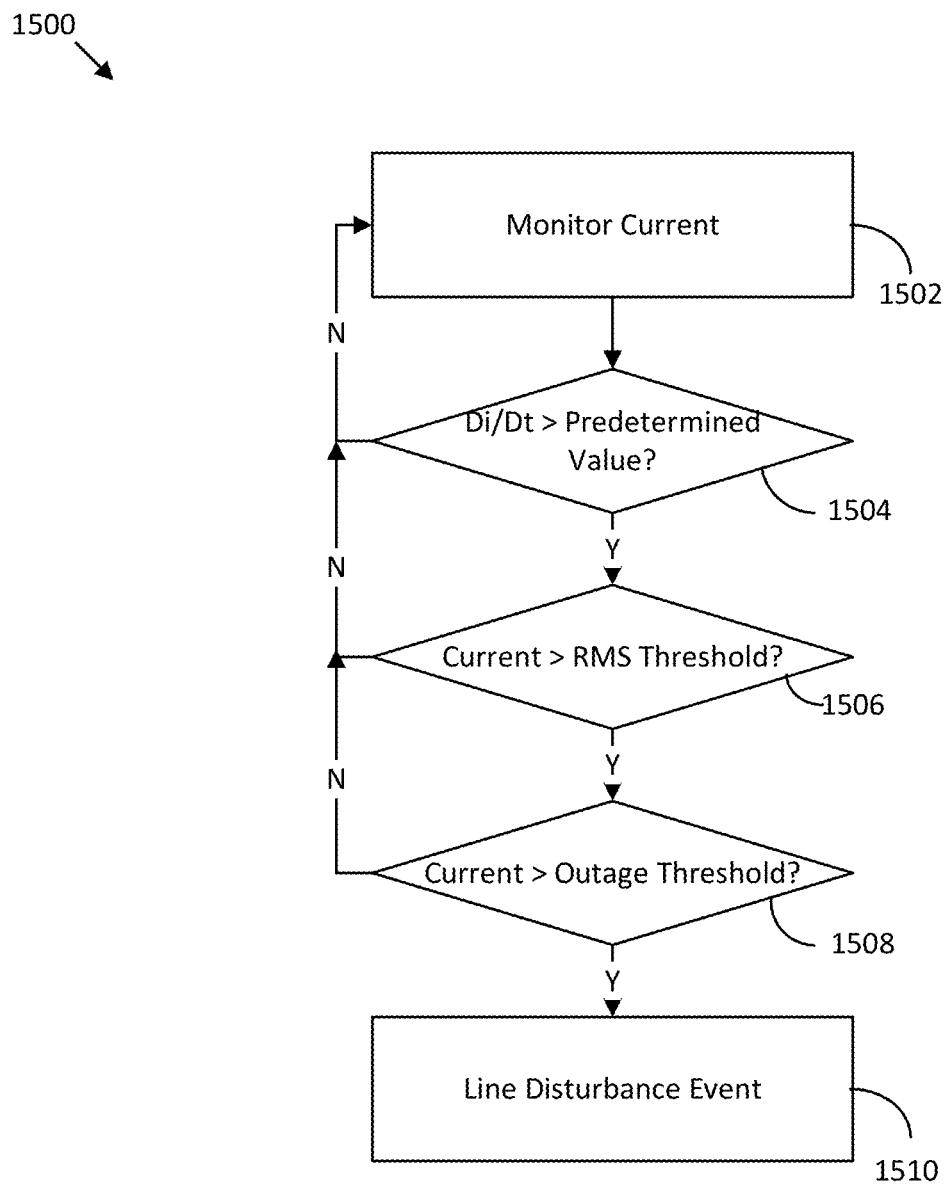
FIG. 15 is a flow chart illustrating one exemplary embodiment of a method for detecting a line disturbance event.

Turning now to FIG. 15, a process 1500 for determining a line disturbance event is show, according to some embodiments. At process block 1502, a current of a medium voltage power line is monitored, such as described above. In one embodiment, the current is monitored via the sensors 210 of the line monitor 200. While the process 1500 is described with respect to line monitor 200 described above, it is understood that one or more other components, such as the data aggregator 108, the central controller 110, and/or other components may perform one or more of the operations described herein. At process block 1504, the processing circuit 208 determines whether an increase in the current value over time exceeds a predetermined value. In some examples, the increase in current value over time may be expressed as $d_i/d_t$. The predetermined value may be based on one or more factors, such as line voltage, line loading, or other applicable parameters.

In response to determining that the increase in the current value over time does not exceed the predetermined value, the monitoring of the current continues at process block 1502. In response to determining that the increase in the current value over time does exceed the predetermined value, the processing circuit 208 determines whether the monitored current exceeds an expected RMS threshold value at process block 1506. In response to determining that the monitored current does not exceed the expected RMS threshold value, the monitoring of the current continues at process block 1502. In response to determining that the current does exceed the RMS threshold, the processing circuit 208 determines whether the monitored current is greater than an outage threshold at process block 1508. In one embodiment, the outage threshold may be similar to that described in process 1000 above.

In response to determining that the monitored current is not greater than the outage threshold, monitoring of the current is continued at process block 1502. In response to determining that the monitored current is greater than the outage threshold, a line disturbance event is determined to have occurred at process block 1510.

Figure 16:
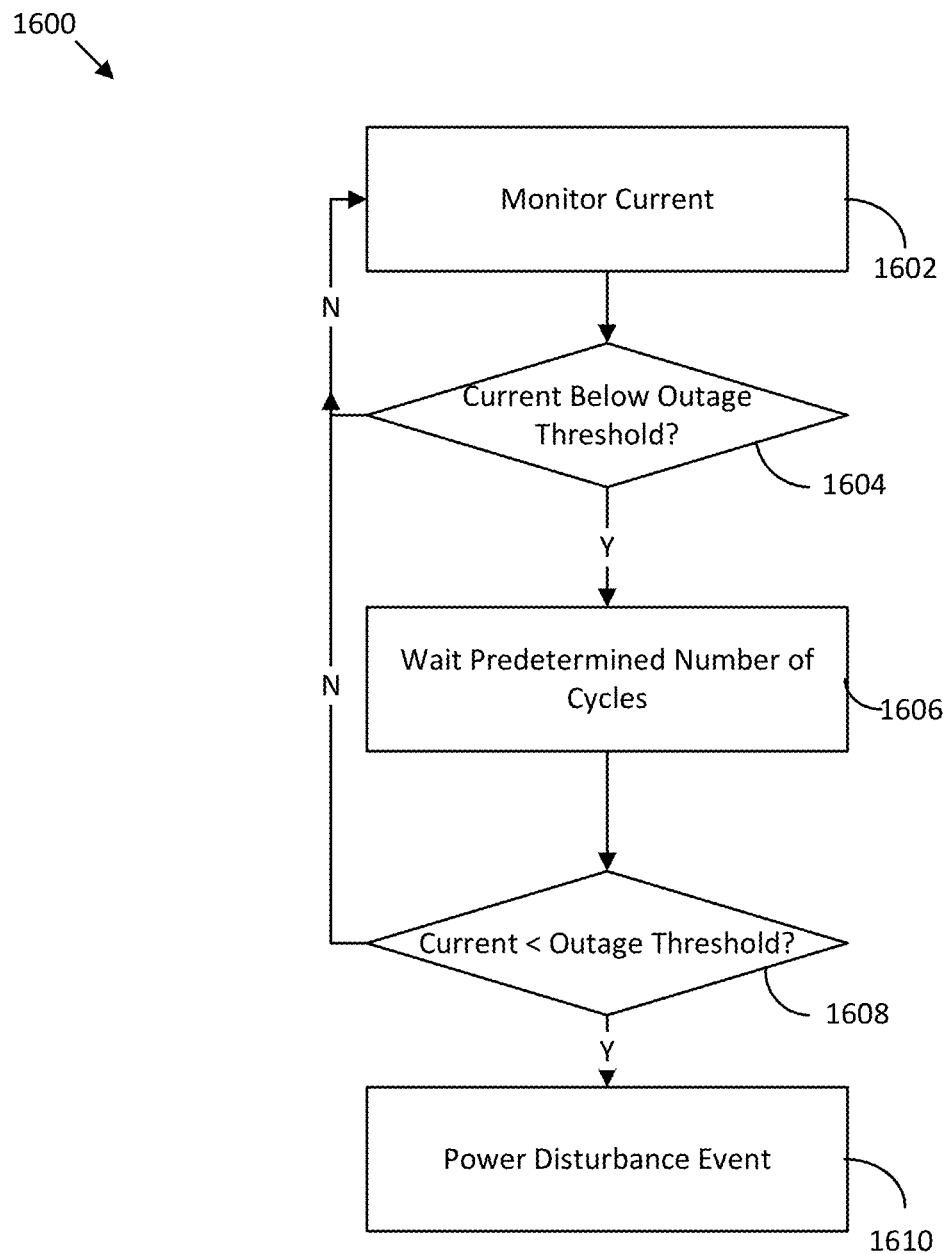
FIG. 16 is a flow chart illustrating one exemplary embodiment of a method for detecting a power disturbance event.

Turning now to FIG. 16, a process 1600 for determining a power disturbance event is shown, according to some embodiments. At process block 1602, a current of a medium voltage power line is monitored, such as described above. In one embodiment, the current is monitored via the sensors 210 of the line monitor 200. While the process 1600 is described with respect to line monitor 200 described above, it is understood that one or more other components, such as the data aggregator 108, the central controller 110, and/or other components may perform one or more of the operations described herein. At process block 1604, the processing circuit 208 determines whether the monitored current is less than an outage threshold. In one embodiment, the outage threshold may be similar to that described in process 1000 above.

In response to determining that the monitored current is not less than the outage threshold, monitoring of the current is continued at process block 1602. In response to determining that the monitored current is less than the outage threshold, the processing circuit 208 waits for a predetermined number of cycles at process block 1606. In one embodiment, the number of cycles is 30 (e.g., 0.5 seconds). However, wait times of more than 30 cycles or less than 30 cycles are also contemplated. Upon waiting the predetermined number of cycles, the processing circuit 208 determines whether the monitored current is still less than the outage threshold at process block 1608. In response to determining that the monitored current is not less than the outage threshold, monitoring of the current continues at process block 1602. In response to determine that the current is less than the outage threshold, a power disturbance event is determined to have occurred at process block 1610.

Figure 17:
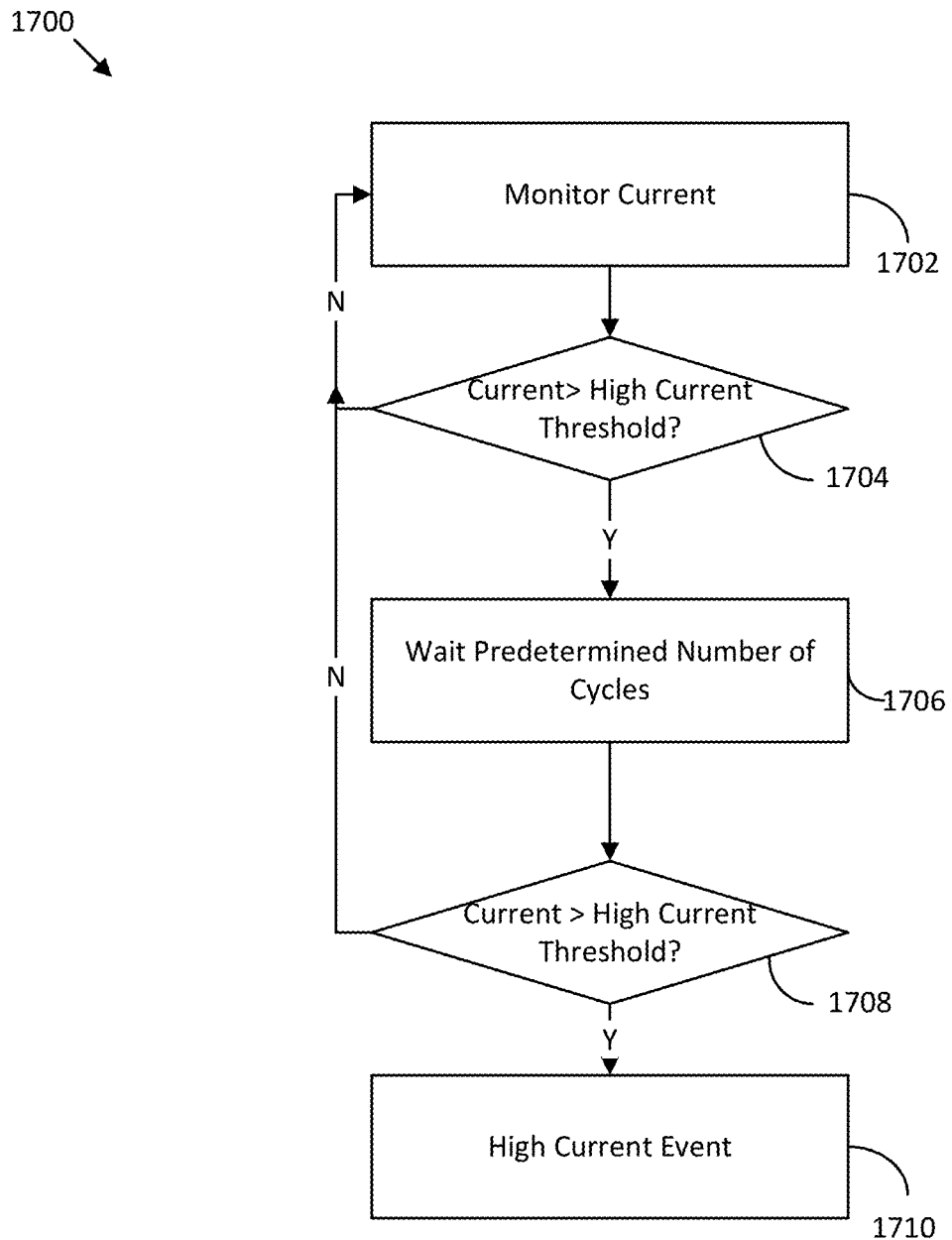
FIG. 17 is a flow chart illustrating one exemplary embodiment of a method for detecting a high current event.

Turning now to FIG. 17, a process 1700 for determining a high current event is shown, according to some embodiments. At process block 1702, a current of a medium voltage power line is monitored, such as described above. In one embodiment, the current is monitored via the sensors 210 of the line monitor 200. While the process 1700 is described with respect to line monitor 200 described above, it is understood that one or more other components, such as the data aggregator 108, the central controller 110, and/or other components may perform one or more of the operations described herein. At process block 1704, the processing circuit 208 determines whether the monitored current is greater than a high current threshold. In one embodiment, the high current threshold may be a percentage of a full-load current value, such as 120%. However, values of more than 120% or less than 120% are also contemplated.

In response to determining that the monitored current is not greater than the high current threshold, monitoring of the current is continued at process block 1702. In response to determining that the monitored current is greater than the high current threshold, the processing circuit 208 waits for a predetermined number of cycles at process block 1706. In one embodiment, the number of cycles is 30 (e.g., 0.5 seconds). However, wait times of more than 30 cycles or less than 30 cycles are also contemplated. Upon waiting the predetermined number of cycles, the processing circuit 208 determines whether the monitored current is still greater than the high current threshold at process block 1708. In response to determining that the monitored current is not greater than the high current threshold, monitoring of the current continues at process block 1702. In response to determine that the current is greater than the high current threshold, a high current event is determined to have occurred at process block 1710.

Figure 18:
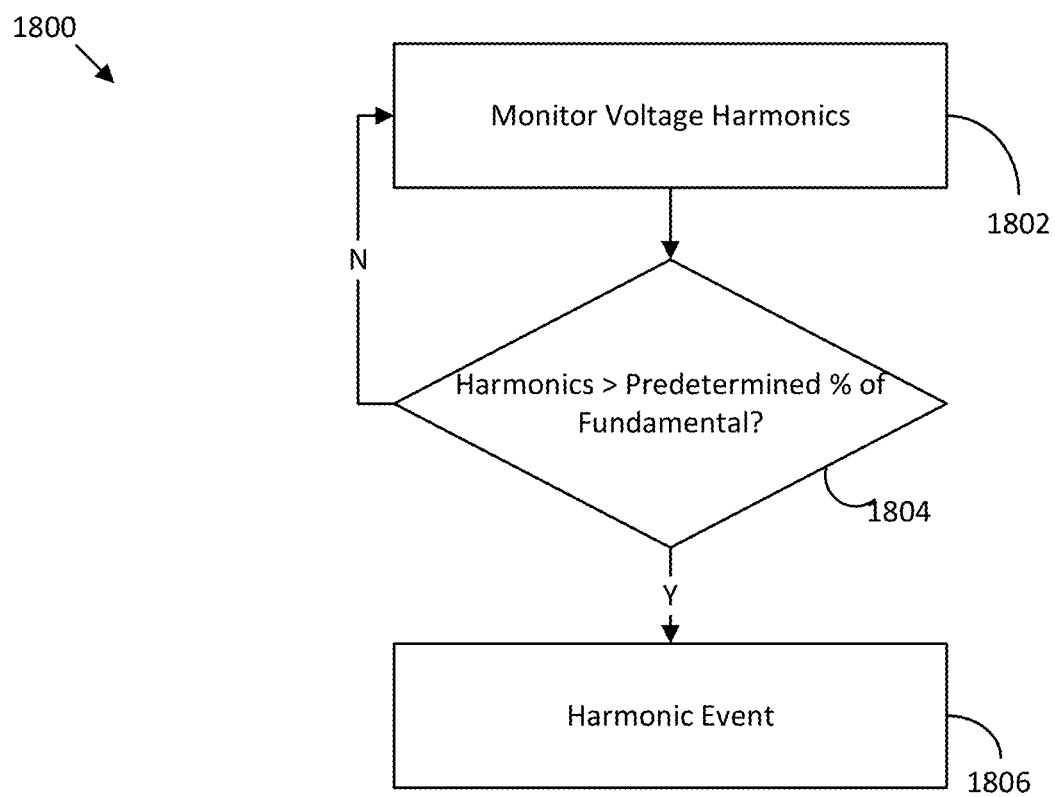
FIG. 18 is a flow chart illustrating one exemplary embodiment of a method for detecting a harmonic event.

Turning now to FIG. 18, a process 1800 for detecting a harmonic event is shown, according to some embodiments. At process block 1802, one or more harmonics (e.g., $3^{rd}$, $5^{th}$, etc.) of a medium voltage power line are monitored. In one embodiment, the harmonics are monitored via the sensors 210 of the line monitor 200. While the process 1800 is described with respect to line monitor 200 described above, it is understood that one or more other components, such as the data aggregator 108, the central controller 110, and/or other components may perform one or more of the operations described herein. At process block 1804, the processing circuit 208 determines whether any of the monitored harmonics exceeds a predetermined percentage of the fundamental. In one embodiment, the predetermined percentage may be 20%. However, values of more than 20% or less than 20% are also contemplated. Further, each harmonic may have a specific predetermined percentage associated therewith. In response to determining that none of the monitored harmonics exceed the predetermine percentage of the fundamental, the monitoring of the harmonics continues at process block 1802. In response to determining that one or more of the monitored harmonics exceed the predetermined percentage of the fundamental, a harmonic event is determined to have occurred at process block 1806. In some examples, the harmonic even may apply to each harmonic that is determined to exceed the associated predetermined percentage.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations and should in no way be construed to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A first monitoring device associated with a first phase of medium voltage power distribution system, the first monitoring device comprising:
    one or more sensors configured to sense one or more parameters of the first phase of the medium voltage power distribution system;
    a communication module; and
    a controller electrically coupled to the one or more sensors and the communication module, and configured to:
        store the one or more sensed parameters in a memory of the first monitoring device;
        determine whether an event has occurred based on the sensed parameters;
        determine a duration of the event;
        transmit a first coordination signal to at least a second monitoring device associated with a second phase of the medium voltage power distribution system via the communication module in response to determining the event has occurred; and
        transmit a first event message to a data aggregator device in response to determining the event has occurred, wherein the event message includes the one or more sensed parameters associated with the determined event, the determined duration of the event, and pre-event data, wherein an amount of pre-event data is dynamically determined based on the determined duration of the event.

2. The first monitoring device of claim 1, wherein the controller is further configured to:
    receive a second coordination signal from the second monitoring device at the communication module;
    access one or more stored parameters based on the received second coordination signal; and
    transmit a second event message to the data aggregator using the communication module, wherein the second event message includes the one or more stored parameters.

3. The first monitoring device of claim 1, wherein the data aggregator is configured to:
    aggregate the first event message and the second event message to generate aggregated data; and
    transmit the aggregated data to a central controller configured to determine an event type.

4. The first monitoring device of claim 3, wherein the event type is one of an arc fault, a capacitor bank failure, and a voltage imbalance.

5. The first monitoring device of claim 1, wherein the duration of the event is one of a permanent event and a momentary event.

6. The first monitoring device of claim 1, wherein the sensed parameters includes a current associated with the first phase of the medium voltage power distribution system.

7. The first monitoring device of claim 1, wherein the one or more sensed parameters in the first event message include the one or more sensed parameters over a first time period, and wherein the first coordination signal includes a request for data over the first time period.

8. A method for coordinating one or more monitoring devices associated with a medium voltage distribution system, the method comprising:
    sensing one or more parameters of a first phase of the medium voltage distribution system;
    storing the one or more sensed parameters in a memory of a first monitoring device;

determining whether an event associated with the first phase has occurred based on the sensed one or more parameters;

determining a duration of the event;

transmitting a first coordination signal to a second monitoring device associated with a second phase of the medium voltage power distribution system via a communication module in response to determining the event has occurred; and transmitting a first event message to a data aggregator device in response to determining the event has occurred, wherein the event message includes one or more sensed parameters associated with the determined event, the determined duration of the event, and pre-event data, wherein an amount of pre-event data is dynamically determined based on the determined duration of the event.

9. The method of claim 8, further comprising:

receiving a second coordination signal from the second monitoring device;

accessing one or more stored parameters based on the received second coordination signal; and transmitting a second event message to the data aggregator using the communication module, wherein the second event message includes the one or more stored parameters.

10. The method of claim 8, wherein the data aggregator is configured to:

generate aggregated data by aggregating the first event message and the second event message; and transmit the aggregated data to a central controller configured to determine an event type.

11. The method of claim 10, wherein the event type is one of an arc fault, a capacitor bank failure, and a voltage imbalance.

12. The method of claim 8, wherein the first coordination signal is transmitted using a Bluetooth low energy communication protocol.

13. The method of claim 8, wherein the one or more sensed parameters in the first event message include the one or more sensed parameters over a first time period, and wherein the first coordination signal includes a request for data over the first time period.

14. The method of claim 8, wherein the one or more sensed parameters include a current associated with the first phase of the medium voltage power distribution system.

15. A system for coordinating one or more monitoring devices associated with a medium voltage distribution system, the system comprising:

a data aggregation device a first monitoring device associated with a first phase of the medium voltage distribution system; and a second monitoring device associated with a second phase of the medium voltage distribution system;

wherein the first monitoring device is configured to:

sense one or more parameters of the first phase, wherein the one or more parameters include a current of the first phase;

store the one or more sensed parameters in a memory of the first monitoring device;

determine whether an event has occurred based on the sensed parameters, wherein the event is determine to occur based on the current of the first phase exceeding a predetermined value within a predetermined time;

determine a duration of the event;

transmit a coordination signal to at least a second monitoring device associated with a second phase of the medium voltage distribution system via the communication module in response to determining the event has occurred; and transmit a first event message to the data aggregator device in response to determining the event has occurred, wherein the event message includes one or more sensed parameters associated with the determined event, the determined duration of the event, and pre-event data, wherein an amount of pre-event data is dynamically determined based on the determined duration of the event.

16. The system of claim 15, wherein the second monitoring device is configured to:

receive the coordination signal from the first monitoring device access one or more stored parameters based on the received coordination signal; and transmit a second event message to the data aggregator using the communication module, wherein the second event message includes the one or more stored parameters.

17. The system of claim 15, wherein the data aggregator is configured to:

aggregate the first event message and the second event message to generate aggregated data; and transmit the aggregated data to a central controller configured to determine an event type.

18. The system of claim 17, wherein the first monitoring device is further configured to determine the event has occurred based on the current of the first phase exceeding a predetermined value within a predetermined time.

19. The system of claim 15, wherein the one or more sensed parameters in the first event message include the one or more sensed parameters over a first time period.

20. The system of claim 19, wherein the first coordination signal includes a request for data over the first time period.

* * * * *